United States Patent
Yamauchi

(10) Patent No.: US 8,055,120 B2
(45) Date of Patent: Nov. 8, 2011

(54) HIGH SPEED DUBBING APPARATUS

(75) Inventor: Kenichiro Yamauchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1250 days.

(21) Appl. No.: 10/594,747

(22) PCT Filed: Jan. 17, 2005

(86) PCT No.: PCT/JP2005/000489
§ 371 (c)(1),
(2), (4) Date: Sep. 28, 2006

(87) PCT Pub. No.: WO2005/093746
PCT Pub. Date: Oct. 6, 2005

(65) Prior Publication Data
US 2007/0201814 A1 Aug. 30, 2007

(30) Foreign Application Priority Data
Mar. 29, 2004 (JP) ................................. 2004-096328

(51) Int. Cl.
*H04N 5/93* (2006.01)
(52) U.S. Cl. ....................................................... 386/279
(58) Field of Classification Search ................ 386/1, 46, 386/52, 83, 92, 95, 109, 112, 124–126, 131
See application file for complete search history.

(56) References Cited

U.S. PATENT DOCUMENTS

| 5,603,003 A | 2/1997 | Akizawa et al. |
| 5,745,789 A | 4/1998 | Kakuta |
| 6,047,103 A | 4/2000 | Yamauchi et al. |
| 7,057,986 B2 * | 6/2006 | Fukuchi ..................... 369/47.31 |

(Continued)

FOREIGN PATENT DOCUMENTS

JP     5-265661 A     10/1993

(Continued)

OTHER PUBLICATIONS

Japanese Office Action, with English Translation, issued in Japanese Patent Application No. JP 2006-511392 dated Sep. 16, 2008.

*Primary Examiner* — William Vaughn, Jr.
*Assistant Examiner* — Tat Chio
(74) *Attorney, Agent, or Firm* — McDermott Will & Emery LLP

(57) ABSTRACT

The time necessary for dubbing of a bit stream is reduced. A high speed dubbing apparatus includes: a read section (20) for reading a bit stream conforming to a DVD-VR standard from a first storage device (10), and outputting the bit stream; a first buffer (30) for storing an output from the read section (20) and outputting a bit stream; a navigation pack generator (40) for replacing a real time data information pack in the bit stream output from the first buffer (30) with a navigation pack, and outputting a resultant bit stream; a second buffer (50) for storing an output from the navigation pack generator (40) and outputting a bit stream; and a write section (60) for converting the bit stream output from the second buffer (50) into a bit stream conforming to a DVD-video standard, and writing the resultant bit stream in a second storage device (70). At least two of the read section (20), the navigation pack generator (40) and the write section (60) operate in parallel.

17 Claims, 31 Drawing Sheets

U.S. PATENT DOCUMENTS

2003/0152372 A1* 8/2003 Shimizu et al. ............... 386/131

FOREIGN PATENT DOCUMENTS

| | | |
|---|---|---|
| JP | 10-79174 A | 3/1998 |
| JP | 11-316654 A | 11/1999 |
| JP | 2000-353126 A | 12/2000 |
| JP | 2001-35078 A | 2/2001 |
| JP | 2002-150672 A | 5/2002 |
| JP | 2003-101927 A | 4/2003 |
| JP | 2003-109306 A | 4/2003 |
| JP | 2003-242721 A | 8/2003 |
| JP | 2003-346420 A | 12/2003 |
| JP | 2004-510285 | 4/2004 |
| JP | 2005-141788 | 6/2005 |
| WO | WO 02/27726 A1 | 4/2002 |

* cited by examiner

STORAGE DEVICE 10

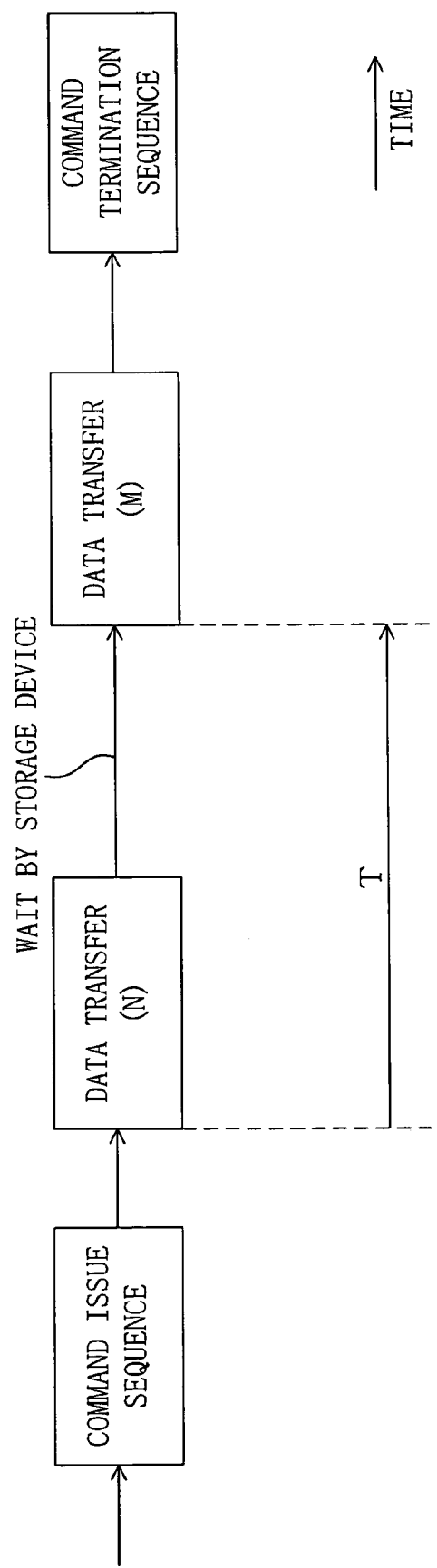

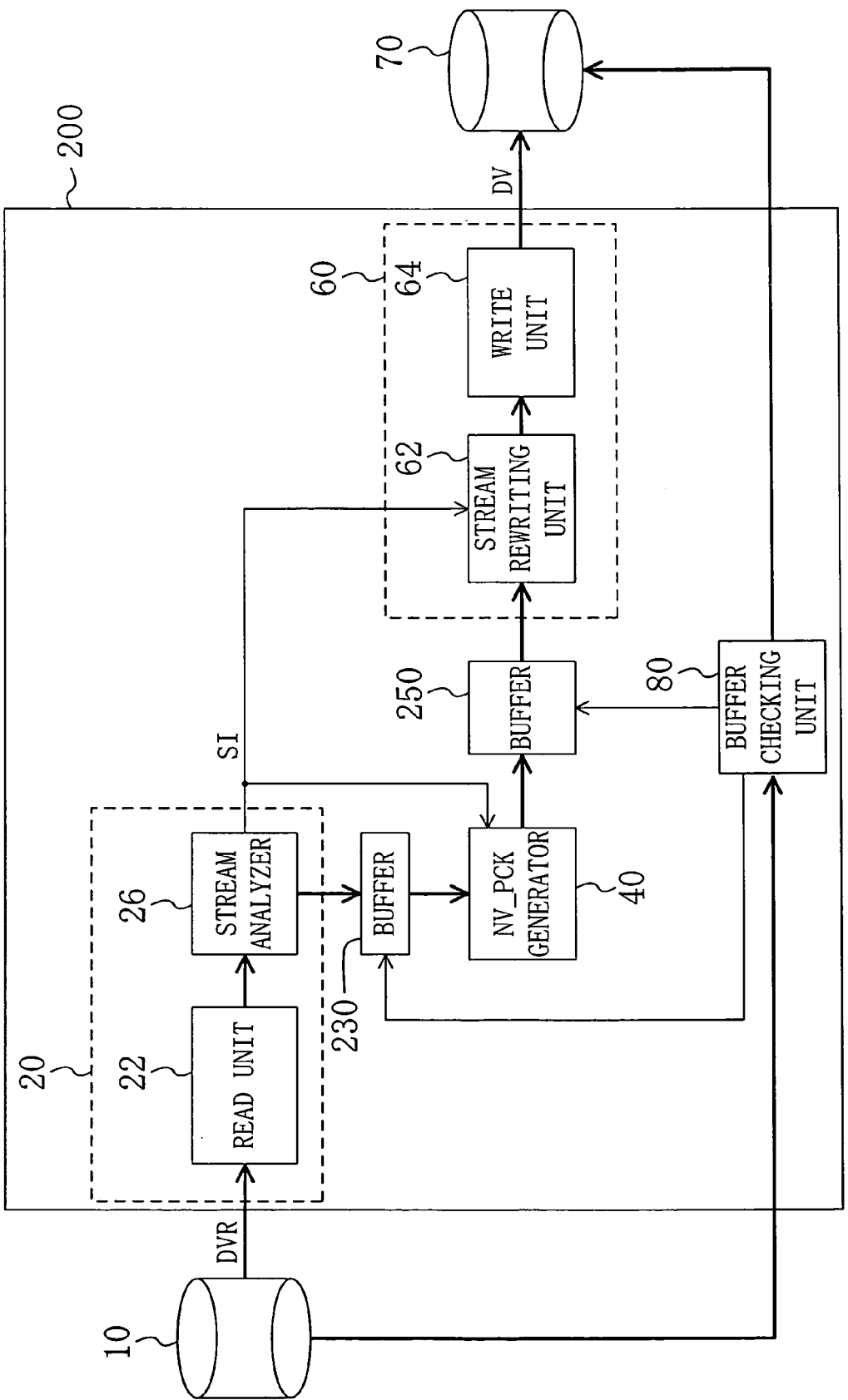

FIG. 20
GENERAL VIDEO RECORDING STANDARD
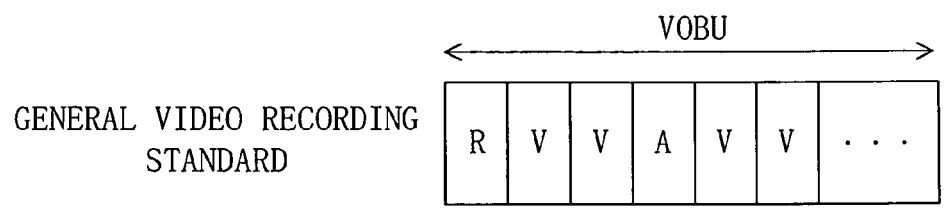
OUTPUT OF STORAGE DEVICE 310
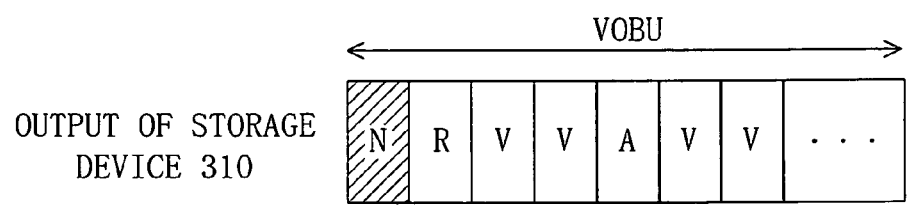

HIGH SPEED DUBBING APPARATUS

RELATED APPLICATIONS

This application is the U.S. National Phase under 35 U.S.C. §371 of International Application No. PCT/JP2005/000489, filed on Jan. 17, 2005, which in turn claims the benefit of Japanese Application No. 2004-096328, filed on Mar. 29, 2004, the disclosures of which Applications are incorporated by reference herein.

TECHNICAL FIELD

The present invention relates to techniques for converting bit streams conforming to the DVD video recording standard (DVD Specifications for Rewritable/Re-recording Discs, Part 3) into a bit stream conforming to the DVD video standard (DVD Specifications for Read-Only Disc, Part 3).

BACKGROUND ART

Recording on DVDs (Digital Versatile Discs) is performed according the DVD video recording (DVD-VR) standard or the DVD-video standard. The DVD-VR standard is used for real-time recording of contents. On the other hand, contents recorded according to the DVD-video standard can be played back by DVD players which are exclusively used for playback.

In digital recording equipment such as DVD recorders, recording is generally performed according to the DVD-VR standard because editing is easy. However, to perform playback by other equipment such as a DVD player, it is necessary to convert the format of a content recorded according to the DVD-VR standard into another format conforming to the DVD-video standard.

To convert the format of a recorded content from the DVD-VR standard into the DVD-video standard, a method in which a digital signal is decoded, coded again and then recorded can be used. In this method, however, coding is performed again after decoding. Accordingly, this method has not only a problem in which the time necessary for the conversion is equal to the actual length of the content but also a problem in which the image quality of the content deteriorates.

In view of this, a technique of converting a digital-recorded content into another format while leaving the content digital without decoding is proposed. For example, an apparatus and a method for converting a bit stream in an RTR (Real Time Recording) format into a bit stream in a DVD-video standard format are disclosed in Patent Document 1. Hereinafter, a conversion in which a bit stream conforming to the DVD-VR standard as data in the RTR format is directly converted into a bit stream conforming to the DVD-video standard while leaving the bit stream digital without decoding will be referred to as a "digital conversion".

Patent Document 1: Japanese Unexamined Patent Publication No. 2003-242721

DISCLOSURE OF INVENTION

Problems that the Invention is to Solve

Dubbing for converting a bit stream conforming to the DVD-VR standard format into a bit stream conforming to the DVD-video standard format needs processes of stream readout, navigation pack generation, stream rewriting and stream writing, so that the time which is the sum of the time necessary for all these processes is needed.

However, the time necessary for stream readout and stream writing depends on the performance of a storage device. Specifically, even if the speed of the other processes is increased, the total speed of dubbing is limited by stream readout and stream writing, so that a problem in which the dubbing speed cannot be increased to a certain level arises.

An object of the present invention is to reduce the time necessary for dubbing of a bit stream from a storage device to another storage device.

Means of Solving the Problem

In one aspect of the present invention, a high speed dubbing apparatus includes: a read section for reading a bit stream conforming to a DVD-VR standard from a first storage device, and outputting the bit stream; a first buffer for storing an output from the read section and outputting a bit stream; a navigation pack generator for replacing a real time data information pack in the bit stream output from the first buffer with a navigation pack, and outputting a resultant bit stream; a second buffer for storing an output from the navigation pack generator and outputting a bit stream; and a write section for converting the bit stream output from the second buffer into a bit stream conforming to a DVD-video standard, and writing the resultant bit stream in a second storage device, wherein at least two of the read section, the navigation pack generator and the write section operate in parallel.

With this configuration, the first and second buffers allow reading from the first storage device or writing in the second storage device to be performed in parallel with another processing. Accordingly, reading of a bit stream conforming to the DVD-VR standard and conversion of this bit stream into a bit stream conforming to the DVD-video standard to write the resultant bit stream are performed at high speed.

In the high speed dubbing apparatus, it is preferable that the read section includes a stream analyzer for analyzing the bit stream read out from the first storage device and outputting obtained stream analysis information, the navigation pack generator performs the replacement using the stream analysis information, and the write section includes a stream rewriting unit for performing the conversion using the stream analysis information.

In the high speed dubbing apparatus, the first buffer preferably has a capacity equal to or less than the capacity of a cache memory included in the first storage device.

In the high speed dubbing apparatus, the second buffer preferably has a capacity equal to or less than the capacity of a cache memory included in the second storage device.

It is preferable that the high speed dubbing apparatus further includes a buffer checking unit for measuring the capacity of a cache memory included in the first storage device and outputting a measurement result by performing reading from the first storage device, and the capacity of the first buffer is changed according to the measurement result.

It is preferable that the high speed dubbing apparatus further includes a buffer checking unit for measuring, by performing writing in the second storage device, the capacity of a cache memory included in the second storage device and outputting a measurement result, and the capacity of the second buffer is changed according to the measurement result.

It is preferable that the high speed dubbing apparatus further includes a buffer checking unit for measuring the capacity of a cache memory included in the first storage device by performing reading from the first storage device, for measuring the capacity of a cache memory included in the second storage device by performing writing in the second storage device, and for outputting a smaller one of obtained measurement results, and the capacities of the first and second buffers are changed to a capacity indicated by the measurement result.

In the high speed dubbing apparatus, it is preferable that the read section reads bit streams in parallel from a plurality of said first storage devices in each of which portions of data in the DVD-VR standard format each corresponding to a given number of bits are stored, and the read section outputs the readout bit streams as one bit stream.

The given number is preferably 16.

The given number is preferably 8.

It is preferable that the high speed dubbing apparatus includes a plurality of said first buffers, the read section reads a bit stream from a plurality of said first storage devices in each of which a portion of data in the DVD-VR standard format corresponding to data of a given size is stored and provides an output to a buffer associated with one of the first storage devices from which the readout bit stream has been output, and after reading from one of the first storage devices has started, reading from another one of the first storage devices starts.

The given size is preferably an integral multiple of the size of a VOBU (Video Object Unit).

It is preferable that the high speed dubbing apparatus further includes a write unit for writing, in the first storage device, a bit stream obtained by conversion in the write section and conforming to the DVD-video standard, the read section reads the bit stream conforming to the DVD-video standard and written in the first storage device in the case of performing, after termination of dubbing of a content, dubbing of the content again, and the write section writes the bit stream conforming to the DVD-video standard and read out by the read section in the second storage device.

In the case of dubbing of a portion of the bit stream conforming to the DVD-video standard and read out by the read section, the navigation pack generator preferably modifies a portion of information included in a navigation pack of the bit stream.

In the case of dubbing of a portion of the bit stream conforming to the DVD-video standard and read out by the read section, the write section preferably removes a PES_extension_field in the bit stream or modifies time information.

It is preferable that the high speed dubbing apparatus further includes a filter for controlling an output of the bit stream obtained by conversion in the write section and conforming to the DVD-video standard to the second storage device, the read section monitors copyright information on the bit stream read out from the first storage device and conforming to the DVD-VR standard and outputs a monitoring result, and the filter does not output the bit stream conforming to the DVD-video standard to the second storage device when the monitoring result of the copyright information output from the read section indicates prohibition of copying.

The read section preferably monitors CGMS (Copy Generation Management System) information as the copyright information.

It is preferable that when copyright information on a first portion of the bit stream conforming to the DVD-VR standard indicates prohibition of copying and copyright information on a second portion following the first portion indicates allowance of copying, the read section holds time information on the first portion and uses, as time information on the second portion, a result obtained by subtracting the time information on the first portion from time information on the second portion.

In another aspect of the present invention, a high speed dubbing apparatus includes: a read section for reading a bit stream conforming to a DVD-VR standard and a navigation pack added to the bit stream from a first storage device, removing one of a real time data information pack and the navigation pack in the bit stream, and producing an output; a buffer for storing the output from the read section and outputting a bit stream; and a write section for converting the bit stream output from the buffer into a bit stream conforming to a DVD-video standard, and writing the resultant bit stream in a second storage device, wherein the read section and the write section operate in parallel.

With this configuration, generation of a navigation pack is unnecessary, so that it is sufficient to provide a buffer only between the read section and the write section. This enables reduction of a circuit scale.

The buffer preferably has a capacity equal to or less than the capacity of a cache memory included in the first storage device and equal to or less than the capacity of a cache memory included in the second storage device.

It is preferable that the high speed dubbing apparatus further includes a buffer checking unit for measuring the capacity of a cache memory included in the first storage device by performing reading from the first storage device, measuring the capacity of a cache memory included in the second storage device by performing writing in the second storage device, and outputting a smaller one of obtained measurement results, the capacity of the buffer is changed to a capacity indicated by the measurement result.

Effect of the Invention

According to the present invention, reading of a bit stream conforming to the DVD-VR standard from a storage device and conversion of the bit stream into a bit stream conforming to the DVD-video standard to write the resultant bit stream in a storage device are performed at high speed. Accordingly, a dubbing process in which pictures recorded on a recording medium in a storage device according to the DVD-VR standard format, for example, are recorded on, for example, another recording medium in another storage device according to the DVD-video standard format is performed at high speed.

BRIEF DESCRIPTION OF DRAWINGS

FIG. 16 is a timing chart showing an example of data transfer between a read unit and a storage device illustrated in FIG. 1.

FIG. 18 is a block diagram illustrating an example of a configuration of a high speed dubbing apparatus according to a second embodiment of the present invention.

FIG. 20 is an explanatory diagram illustrating an example of a format of a bit stream output from a storage device illustrated in FIG. 19.

Figure 1:
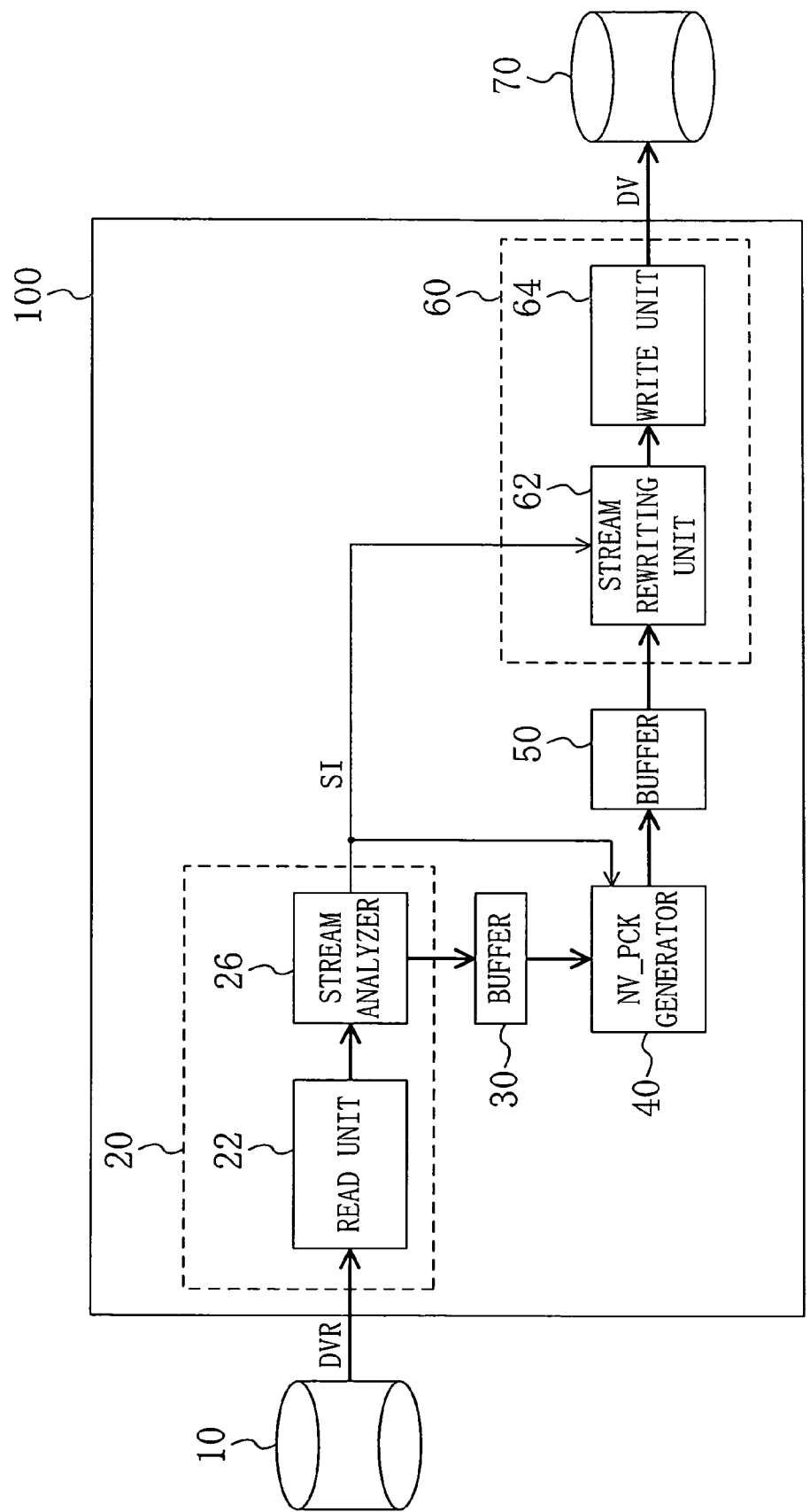
FIG. 1 is a block diagram illustrating an example of a configuration of a high speed dubbing apparatus according to a first embodiment of the present invention.

BRIEF EXPLANATION OF REFERENCE NUMERALS 10, 310, 410, 412, 510, 512 first storage device
16, 76 cache memory
20, 320, 420, 520 read section
26, 326, 526, 527 stream analyzer
30, 230, 530, 532 first buffer
40 navigation pack generator
50, 250 second buffer
60, 660, 760 write section
70 second storage device
100, 200, 300, 400, 500, 600, 700 high speed dubbing apparatus
324, 766 filter

BEST MODE FOR CARRYING OUT THE INVENTION

Hereinafter, embodiments of the present invention will be described with reference to the drawings.

Embodiment 1

FIG. 1 is a block diagram illustrating an example of a configuration of a high speed dubbing apparatus according to a first embodiment of the present invention. The high speed dubbing apparatus 100 illustrated in FIG. 1 includes: a read section 20; a first buffer 30; a navigation pack generator (NV_PCK generator) 40; a second buffer 50; and a write section 60. The read section 20 includes: a read unit 22; and a stream analyzer 26. The write section 60 includes: a stream rewriting unit 62; and a write unit 64. In the high speed dubbing apparatus 100, a bit stream is read out from a first storage device 10, the readout bit stream conforming to the DVD-VR standard (DVD Specifications for Rewritable/Re-recording Discs, Part 3) is converted into a bit stream conforming to the DVD-video standard (DVD Specifications for Read-Only Disc, Part 3) and the converted bit stream is written in a second storage device 70.

In the following embodiments, it is assumed that the storage device 10 is a hard disk drive and the storage device 70 is a DVD-R (DVD-Recordable) drive, as an example. The storage device 10 may be a device which outputs a bit stream conforming to the DVD-VR standard, and may be a DVD-RW (DVD-Rewritable) drive or a DVD-RAM (DVD-Random Access Memory) drive, for example. The storage device 70 may be a device in which a bit stream conforming to the DVD-video standard can be recorded, and may be a hard disk drive or a DVD-RW drive, for example. The storage device 10 and the storage device 70 may be the same device. That is, a converted bit stream conforming to the DVD-video standard may be recorded on a device from which a bit stream conforming to the DVD-VR standard before conversion is output.

Figure 2:
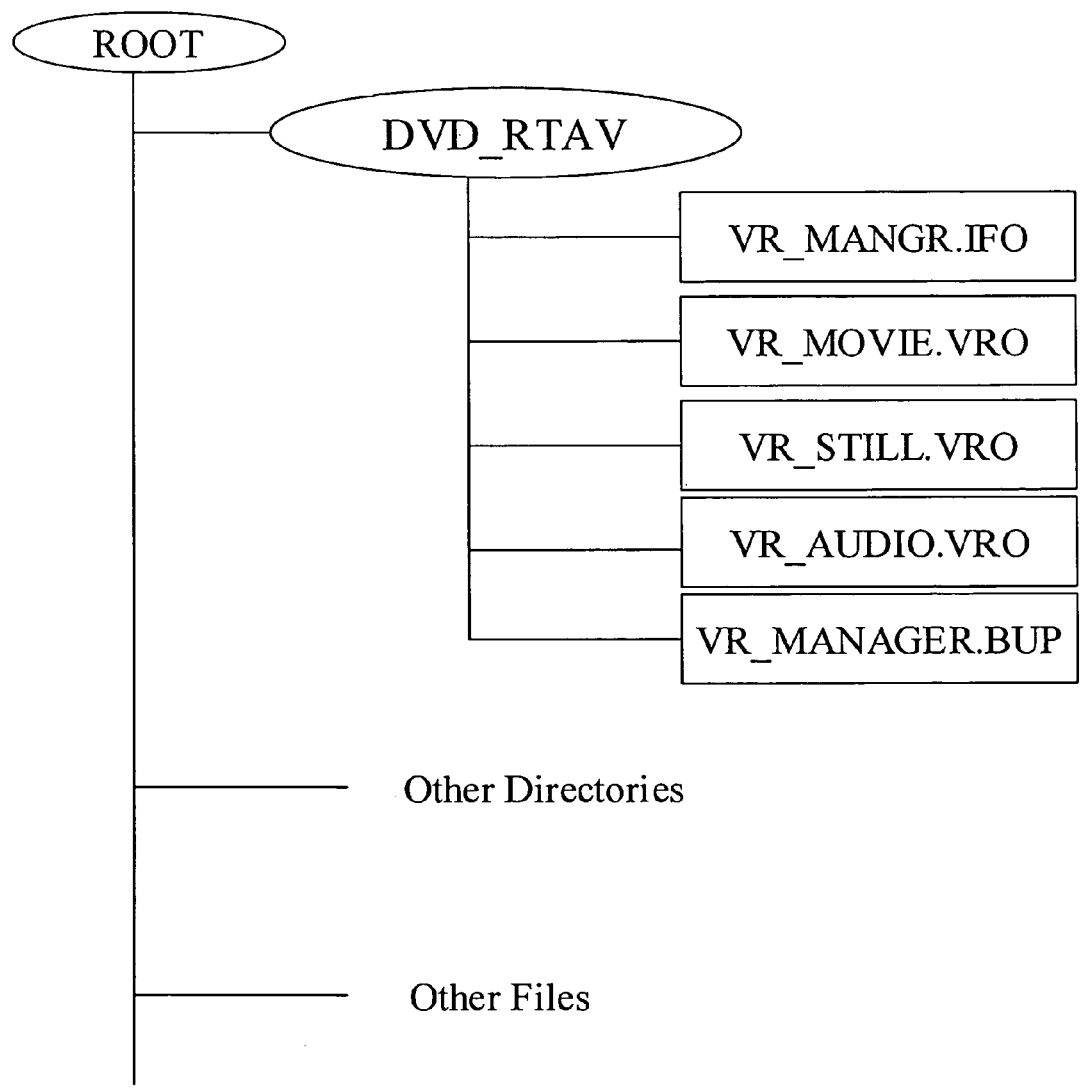
FIG. 2 is an explanatory diagram illustrating a directory structure of a disk on which information is recorded according to the DVD-VR standard.

Now, the DVD-VR standard and the DVD-video standard will be described. FIG. 2 is an explanatory diagram illustrating a directory structure of a disk on which information is recorded according to the DVD-VR standard. As illustrated in FIG. 2, directories of this disk have a hierarchy. A DVD_RTAV is provided under a ROOT directory. This directory includes files: VR_MANGR.IFO, VR_MOVIE.VRO, VR_STILL.VRO, VR_AUDIO.VRO and VR_MANAGER.BUP.

The VR_MANGR.IFO is a file for video management information. Specifically, the VR_MANGR.IFO includes a start address, a time zone, a character code, basic information on a recorded disk, video/audio attributes, information on a still-picture file, playback start/end time, search information on video/audio attributes, an entry point, information on a program chain such as text information, text information on a program and a play list, and other information.

Video data, audio data and subpicture data to be played back from a DVD are stored in the VR_MOVIE.VRO. Each of the video data and the audio data is constituted by a plurality of files in units of VOBs (Video Objects). A still picture is stored in the VR_STILL.VRO. Audio data for displaying a still-picture is stored in the VR_AUDIO.VRO. The VR_MANAGER.BUP is a backup of the VR_MANGR.IFO.

Figure 3:
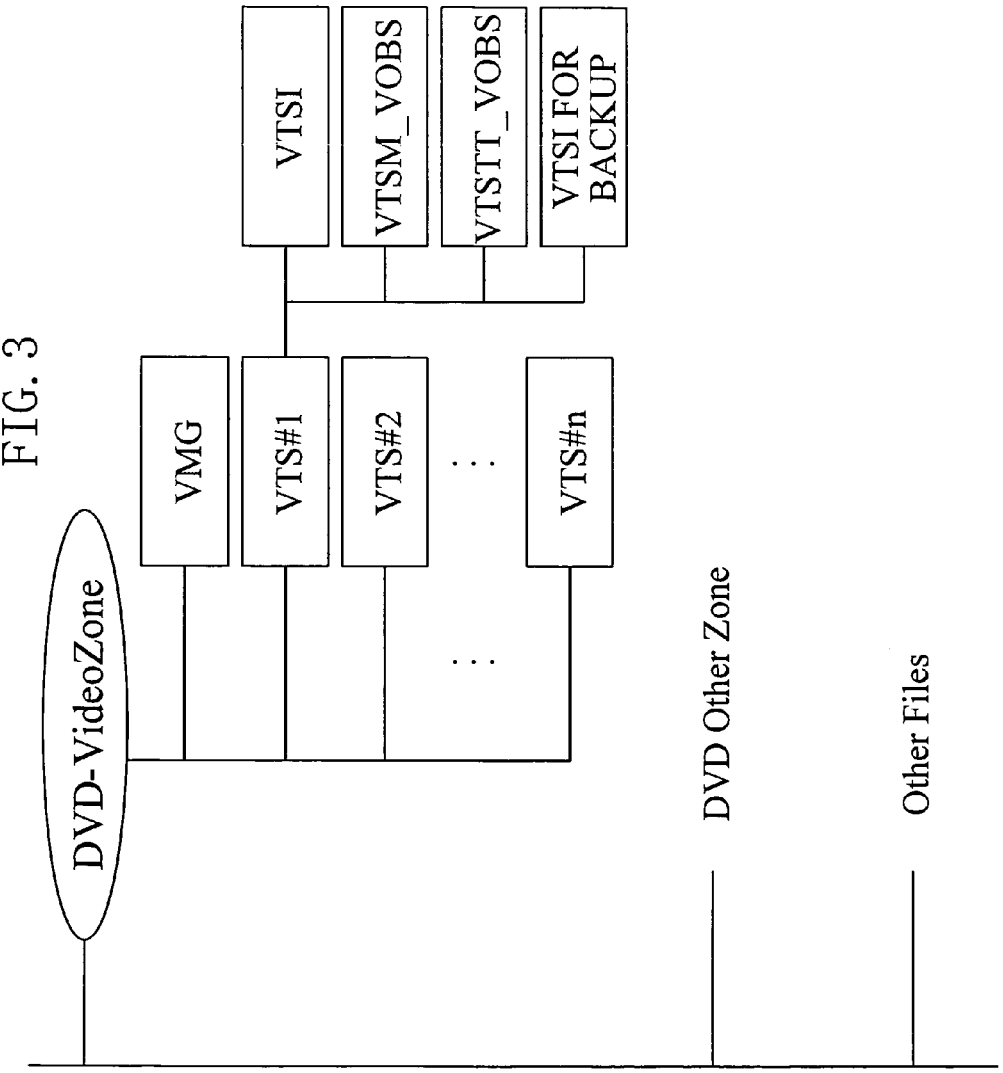
FIG. 3 is an explanatory diagram illustrating a directory structure of a disk on which information is recorded according to the DVD-video standard.

FIG. 3 is an explanatory diagram illustrating a directory structure of a disk on which information is recorded according to the DVD-video standard. A disk conforming to the DVD-video standard has a single DVD Video Zone. The DVD Video Zone is constituted by a VMG (Video Manager) and a plurality of VTSs (Video Title Sets). Each of the VTSs is constituted by a VTSI (Video Title Set Information), a VTSM_VOBS, a VTSTT_VOBS and a VTSI for backup.

The VTSI includes information on playback control of data included in one of the VTSs. In the VTSM_VOBS, information used for a menu of a DVD is stored. Video data, audio data and subpicture data are stored in the VTSTT_VOBS. Each of the video data and audio data is constituted by a plurality of files in units of VOBs.

In a digital conversion, most of the circuit resources and software resources are used to convert VOBs of moving images and audio included in the VR_MOVIE.VRO conforming to the DVD-VR standard into VOBs conforming to the DVD video format standard.

Figure 4:
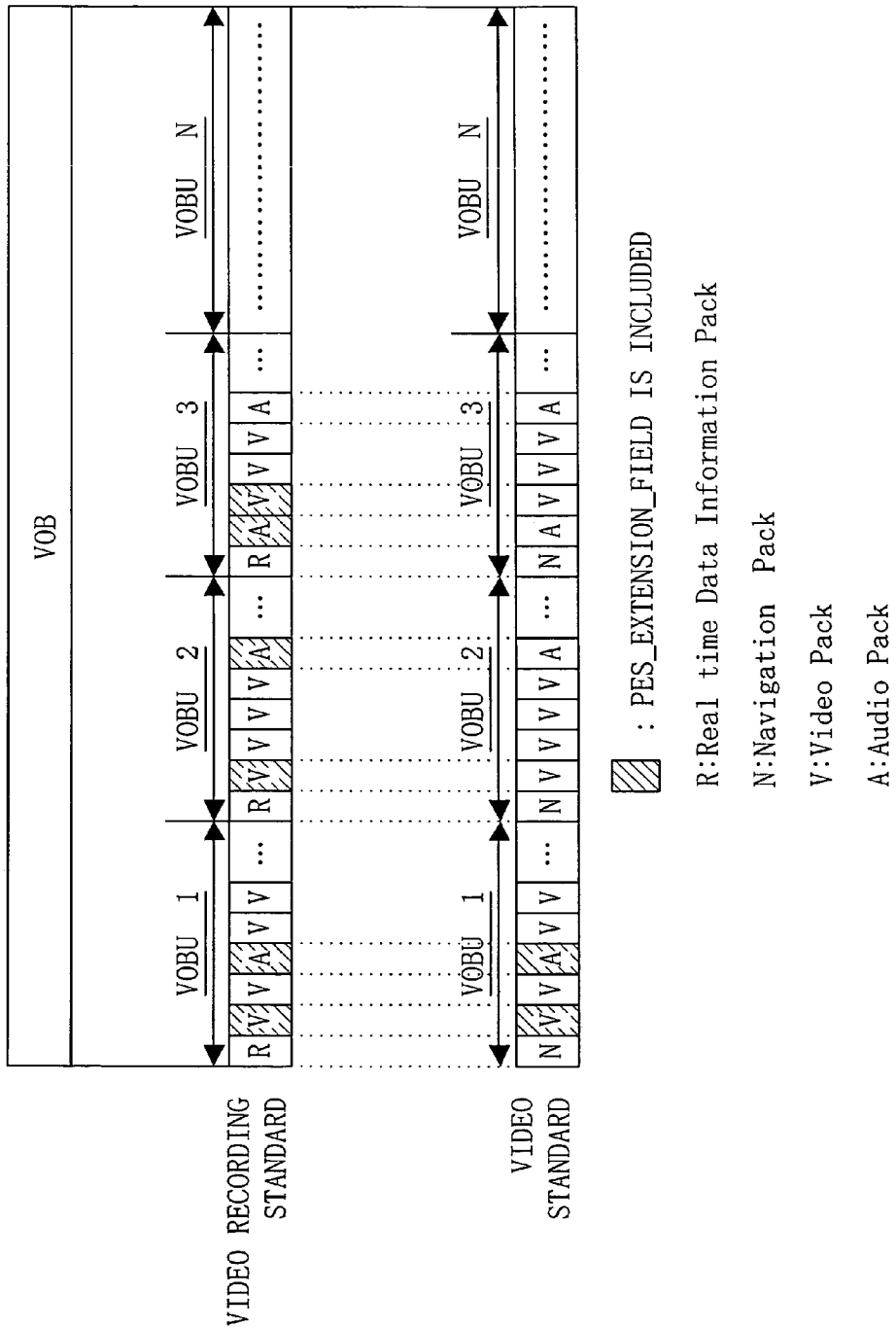
FIG. 4 is an explanatory diagram illustrating structures of VOBs conforming to the DVD-VR standard and the DVD-video standard, respectively.

FIG. 4 is an explanatory diagram illustrating structures of VOBs conforming to the DVD-VR standard and the DVD-video standard, respectively. Each of the VOBs is constituted by a plurality of VOBUs (Video Object Units). In this aspect, the VOBs are common to both of the standards. Each of the VOBUs is constituted by a plurality of packs. Each pack is data of 2048 bytes.

In the DVD-VR standard, each pack is one of a real time data information pack (RDI_PCK), a video pack (V_PCK) and an audio pack (A_PCK). In the DVD-video standard, each pack is one of a navigation pack (NV_PCK), a video pack and an audio pack. In FIG. 4, the hatched sections indicate packs including PES_extension_fields.

In this embodiment, the number of VOBUs in a VOB and the length of the VOB are the same between both of the DVD-VR standard and the DVD-video standard. However, none of the number and the length is specifically defined in the standards. In FIG. 4, the RDI_PCK is placed at the head of each VOBU. However, the head pack of each VOBU is not necessarily the RDI_PCK.

Figure 5:
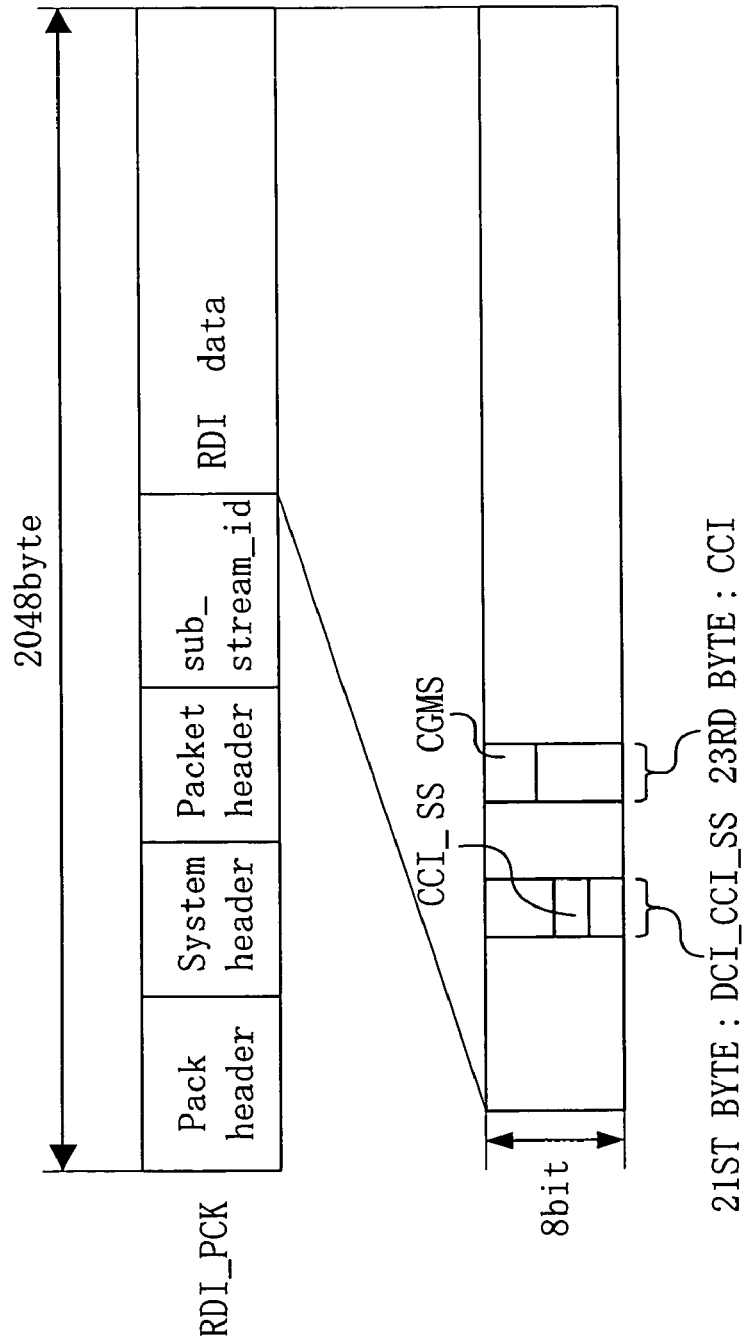
FIG. 5 is an explanatory diagram illustrating a structure of a real time data information pack (RDI_PCK).

FIG. 5 is an explanatory diagram illustrating a structure of a real time data information pack (RDI_PCK). The RDI_PCK is a pack for storing real time information. Real time data and user data are stored in a portion indicated by RDI data in FIG. 5. DCI_CCI_SS information is recorded in the 21st byte from the head of the RDI data. CCI information (Copy Control Information) is recorded in the 23rd byte. CCI_SS information is recorded in the first through third bits in the DCI_CCI_SS.

The CCI_SS information indicates whether the CCI information is valid or not. If the CCI_SS information indicates that the CCI information is valid, the CCI information becomes valid. The eighth through sixth bits in the CCI information are called CGMS (Copy Generation Management System) information and represent copyright information for copy management of the content. If these bits indicate 0x0 (where 0x is added to indicate a hexadecimal number), copying of a content is prohibited. If these bits indicate 0x4, copying of the content is allowed. Dubbing cannot be performed on a content which is not allowed to be copied.

A Pack Header contains a pack header code, time information on the pack (SCR: System Clock Reference), for example. A System Header indicates a bit rate and buffer information, for example. A Packet Header indicates a PES Header of each pack. The type of a pack is determined by a stream ID (stream_d) in this Packet Header and a substream ID (sub_stream_id).

Figure 6:
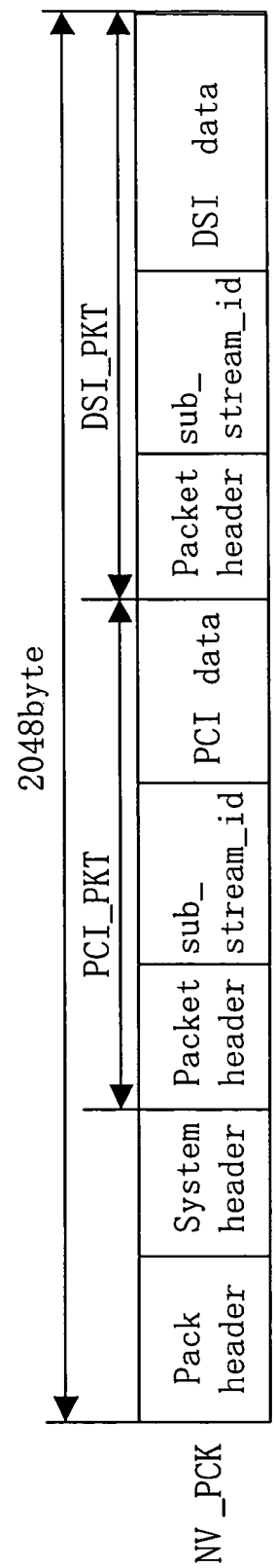
FIG. 6 is an explanatory diagram illustrating a structure of a navigation pack (NV_PCK).

FIG. 6 is an explanatory diagram illustrating a structure of a navigation pack (NVPCK). The NV_PCK is a pack in which positional information on data to be played back and copyright information, for example, are stored. A Pack Header, a System Header, a Packet Header and a sub_stream_id are the same as those in the RDI_PCK.

Figure 7:
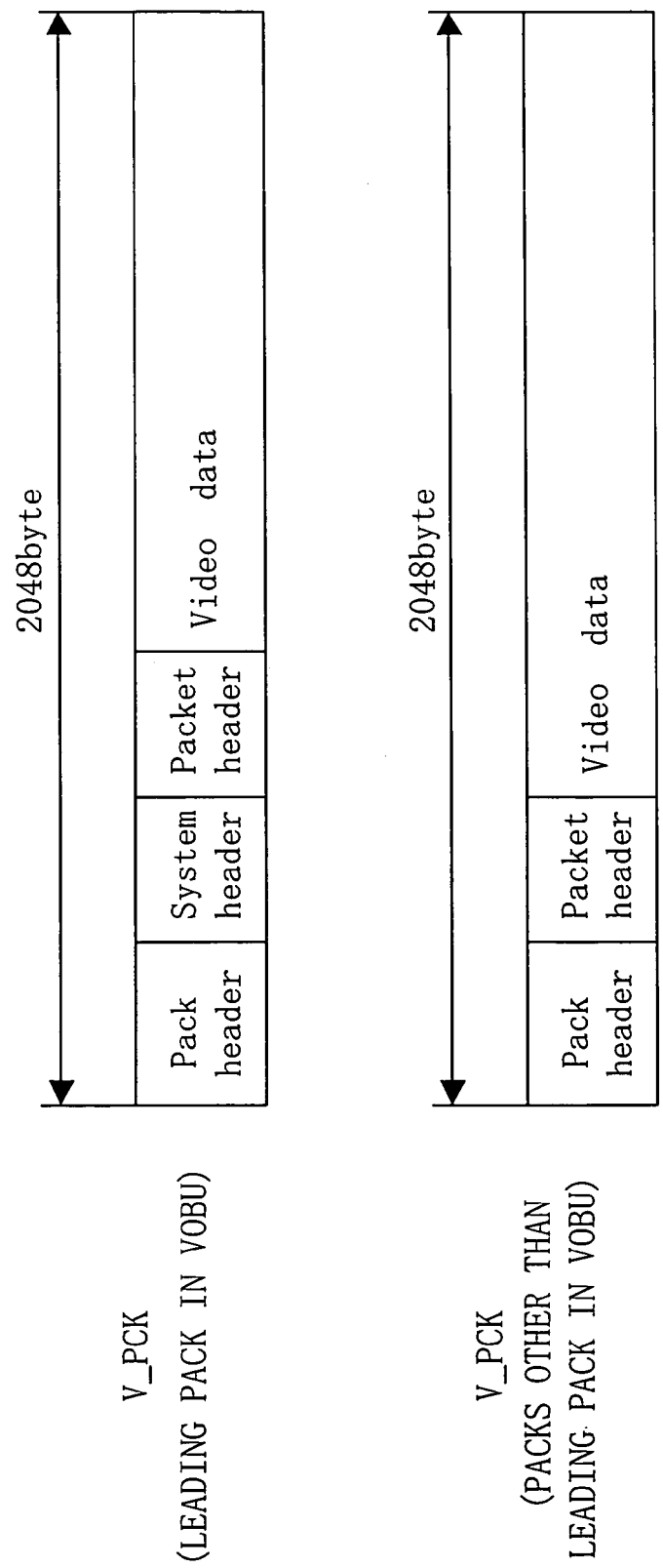
FIG. 7 is an explanatory diagram illustrating structures of video packs (V_PCKs).

FIG. 7 is an explanatory diagram illustrating structures of video packs (V_PCKs). The video packs are packs in which image information is stored. Image data is stored in a portion indicated by a Video data in FIG. 7. A Pack Header, a System Header and a Packet Header are the same as those in the RDI_PCK. If a video pack is a leading pack of a VOBU, this video pack includes a System Header. Otherwise, the video pack includes no System Header.

Figure 8:
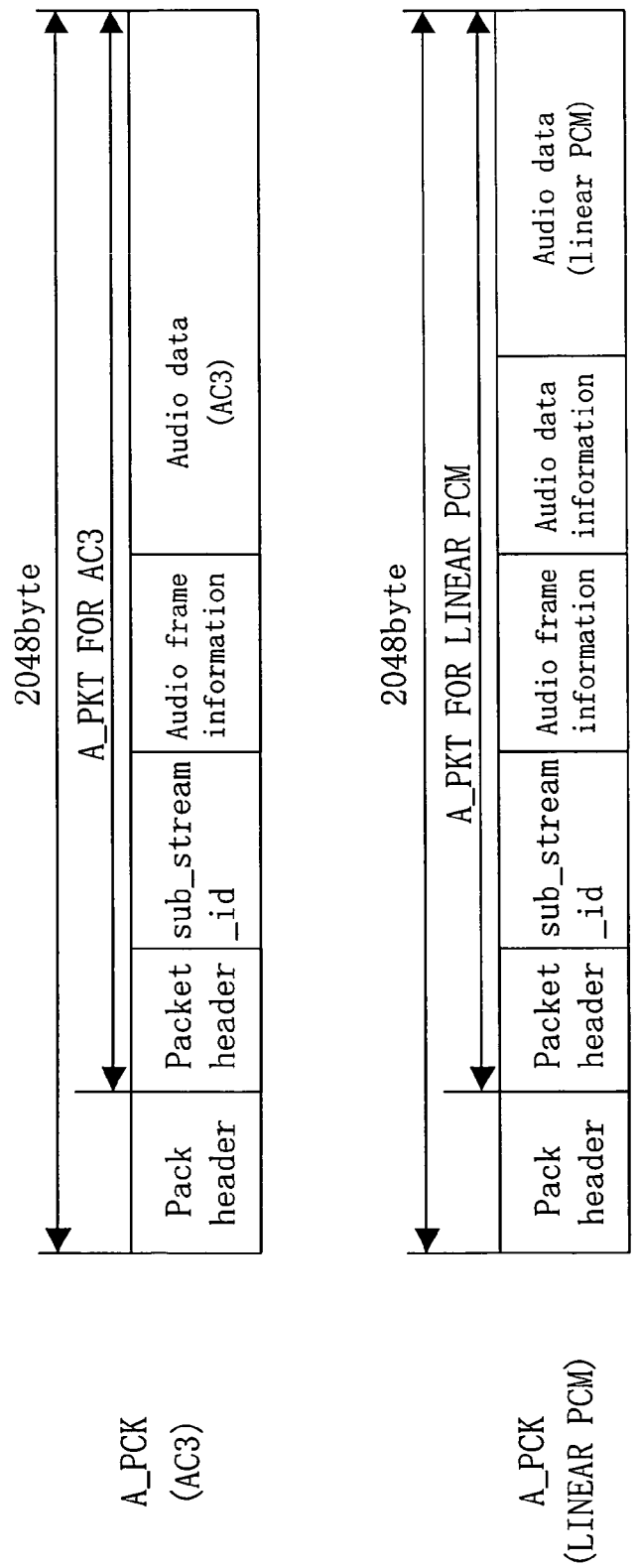
FIG. 8 is an explanatory diagram illustrating structures of audio packs (A_PCKs).

FIG. 8 is an explanatory diagram illustrating structures of audio packs (A_PCKs). The audio packs are packs in which audio data is stored. FIG. 8 show a case in which an audio pack contains audio data in the AC3 format and a case in which an audio pack contains audio data in the linear pulse code modulation (LPCM) format. A Pack Header, a System Header, a Packet Header and a sub_stream_id are the same as those in the RDI_PCK. Audio frame information indicates a frame number, for example, of audio data included in a pack.

In addition, in the case of the LPCM format, the audio pack includes audio data information. This information includes data indicating the number of quantization bits (quantization_word_length), a sampling frequency (audio_sampling_frequency), the number of channels (number_of_audio_channels) and range control (dynamic_range_control).

Now, differences in VOB structure between the DVD-VR standard and the DVD-video standard will be described. Aspects that are permitted in the DVD-VR standard but are not permitted in the DVD-video standard are as follows:
(a) changes in resolution and aspect ratio of pictures
(b) a change in audio attribute
(c) dual mono audio data
(d) VOBUs having playback times of 0.4 sec. or less
In addition, both of the standards have the following differences:
(e) An SCR in the leading pack of a VOB does not need to be zero in the DVD-VR standard but should be zero in the DVD-video standard.
(f) A PES_extension_field included in a pack header is added to the leading pack of each type of packs in each VOBU in the case of the DVD-VR standard, but is allowed to be added only to the leading pack of each type of packs in a VOB in the case of the DVD-video standard.

Figure 9:
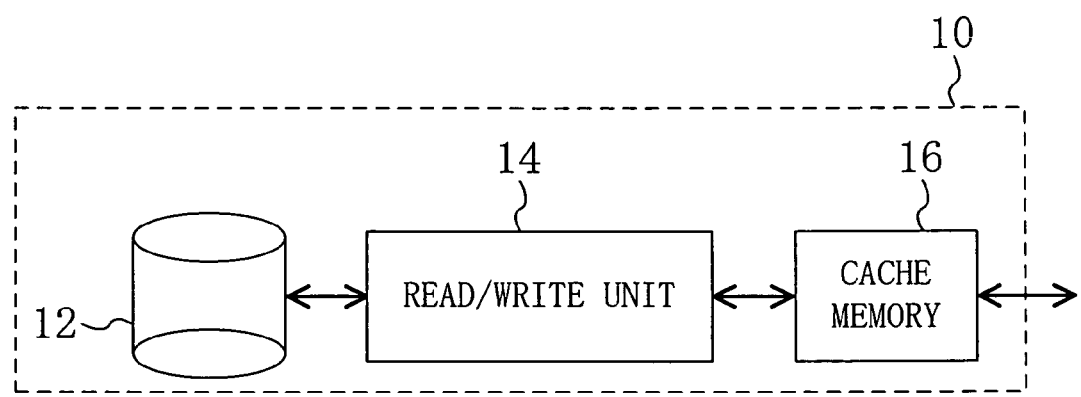
FIG. 9 is a block diagram illustrating an example of a configuration of a first storage device from which a bit stream is read out.

FIG. 9 is a block diagram illustrating an example of a configuration of the first storage device 10 from which a bit stream is read out. The first storage device 10 illustrated in FIG. 9 includes: a read/write unit 14; and a cache memory 16. The read/write unit 14 reads data from a recording medium 12 and writes data in the recording medium 12.

Figure 10:
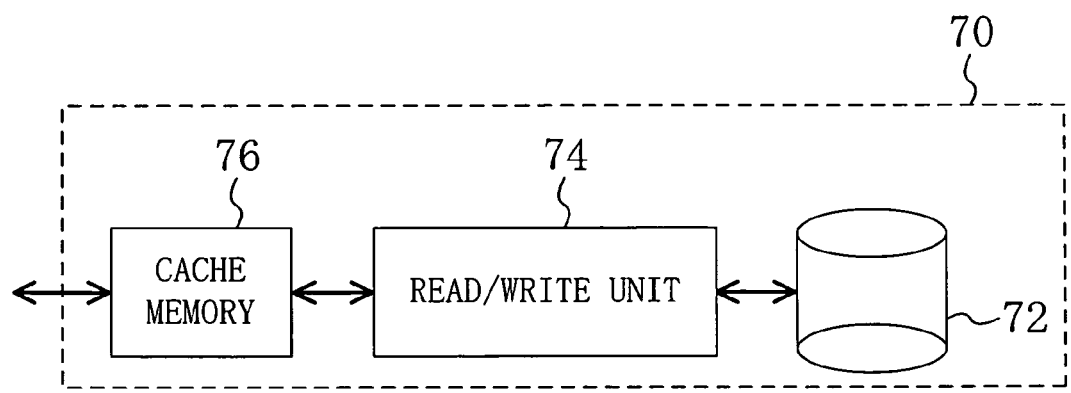
FIG. 10 is a block diagram illustrating an example of a configuration of a second storage device in which a bit stream is written.

FIG. 10 is a block diagram illustrating an example of a configuration of the second storage device 70 in which a bit stream is written. The second storage device 70 illustrated in FIG. 10 includes: a read/write unit 74 and a cache memory 76. The read/write unit 74 writes data in a recording medium 72. The recording medium 72 is a DVD-R disk, for example, and is removable from the second storage device 70.

The high speed dubbing apparatus illustrated in FIG. 1 will be described. A bit stream conforming to the DVD-VR standard is stored in the recording medium 12 in the first storage device 10. The stored bit stream is a bit stream whose video resolution, aspect ratio and audio attributes do not change and which has a playback time of 0.4 seconds or more for each VOBU except for the last VOBU.

Figure 11:
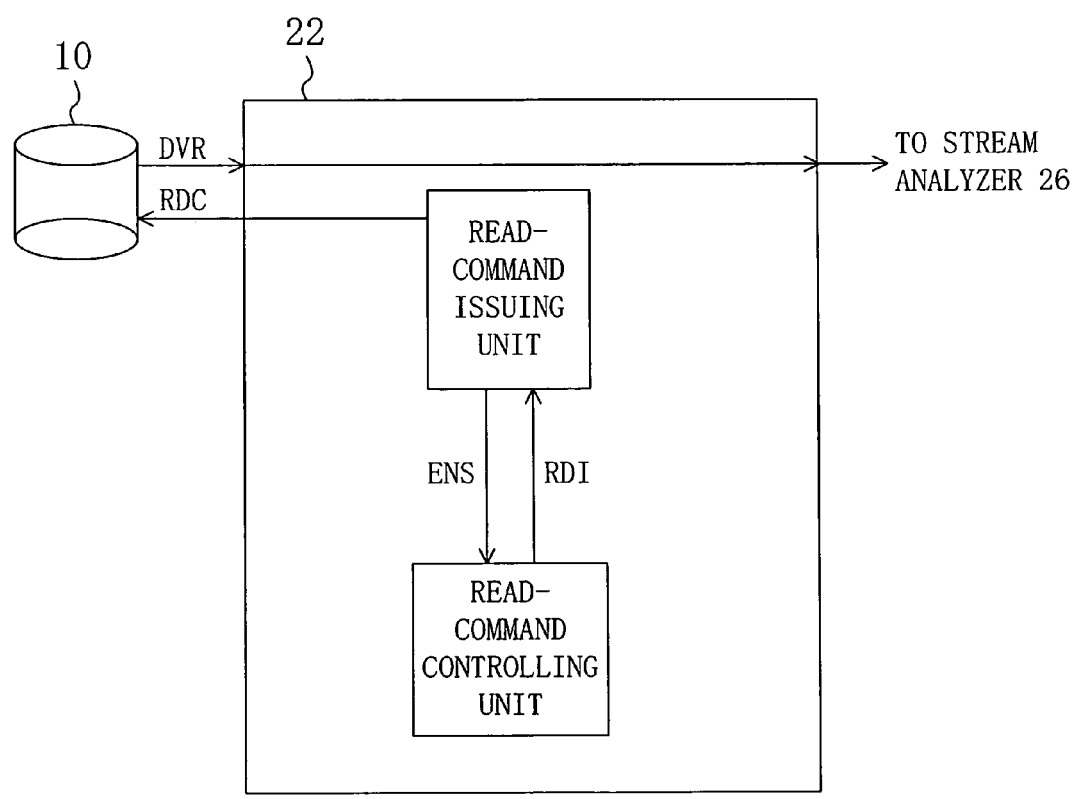
FIG. 11 is a block diagram illustrating a configuration of a read unit illustrated in FIG. 1.

FIG. 11 is a block diagram illustrating a configuration of the read unit 22 illustrated in FIG. 1. The read unit 22 includes: a read-command issuing unit 21; and a read-command controlling unit 23. The read-command controlling unit 23 issues a read instruction RDI to the read-command issuing unit 21. The read instruction RDI contains an address of data stored in the storage device 10 to be read out and read permission.

Upon reception of the read instruction RDI, the read-command issuing unit 21 issues a read command RDC to the storage device 10. Upon reception of the read command RDC, the storage device 10 reads a content in the DVD-VR standard format, and outputs the content to the stream analyzer 26 as a bit stream DVR. When reading is finished, the read-command issuing unit 21 outputs an end signal ENS to the read-command controlling unit 23. The read-command controlling unit 23 does not issue the next read command RDC until the end signal ENS is received.

Figure 12:
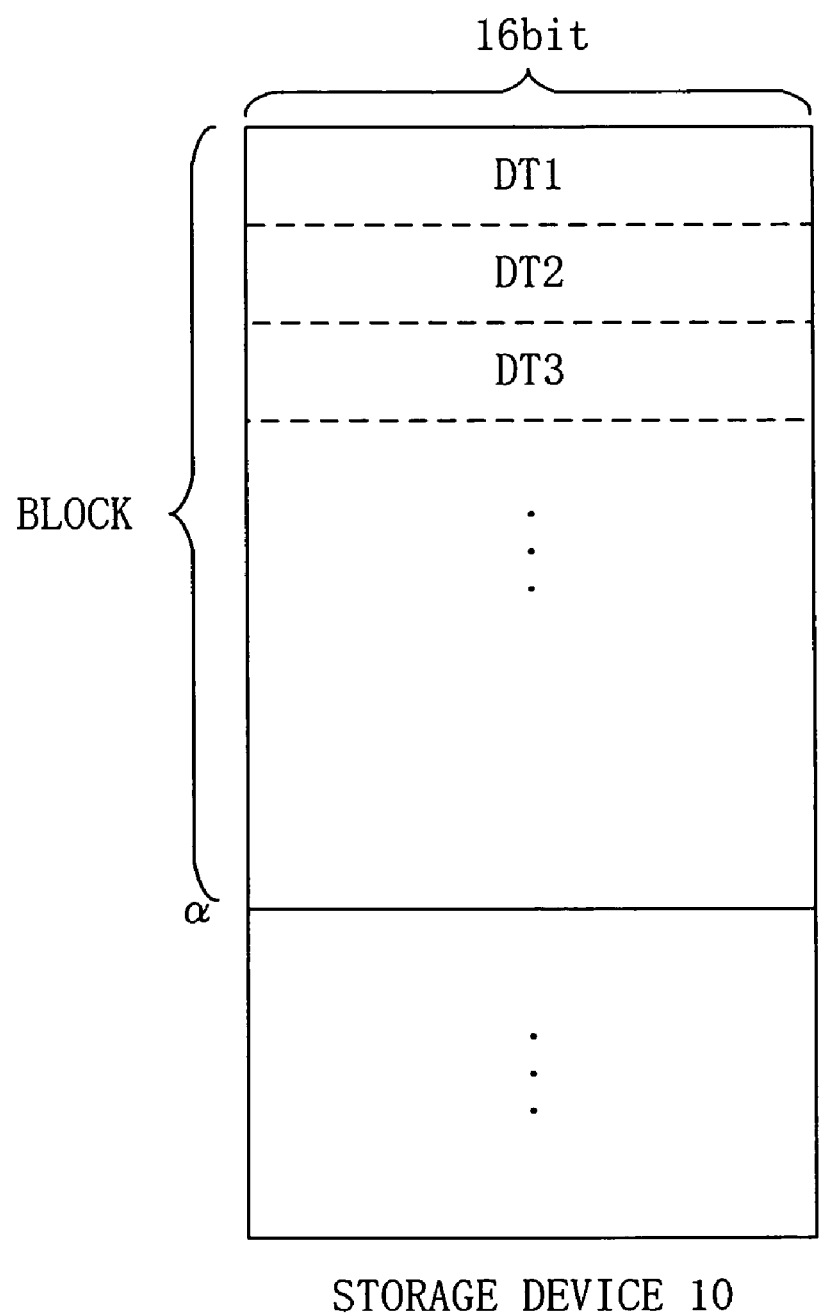
FIG. 12 is an explanatory diagram illustrating a storage state of a content in the DVD-VR standard format in a storage device illustrated in FIG. 1.

FIG. 12 is an explanatory diagram illustrating a storage state of a content in the DVD-VR standard format in the storage device 10 illustrated in FIG. 1. In this case, data is managed in units of 16 bits. In FIG. 12, the content in the DVD-VR standard format is stored as 16-bit data DT1, DT2, . . . For example, one block occupies a region corresponding to a words (where one word is 16 bits).

In this manner, the read unit 22 reads a bit stream DVR conforming to the DVD-VR standard from the storage device 10 and outputs the bit stream DVR to the stream analyzer 26. The stream analyzer 26 analyzes the bit stream DVR and outputs the obtained stream analysis information SI to the NV_PCK generator 40 and the stream rewriting unit 62 and also outputs a bit stream to the buffer 30. The buffer 30 stores the received bit stream and then outputs the bit stream to the NV_PCK generator 40.

The stream analysis information SI is information necessary for converting a bit stream conforming to the DVD-VR standard into a bit stream conforming to the DVD-video standard, and includes information such as an SCR, structures of a VOB and VOBUs, an A_SYNCA, a VOBU_2NDREF_EA, a VOBU_3RDREF_EA, for example.

The NV_PCK generator 40 performs NV_PCK generation. Specifically, the NV_PCK generator 40 generates an NV_PCK from information such as the A_SYNCA, the VOBU_2NDREF_EA, the VOBU_3RDREF_EA contained in the stream analysis information SI, replaces the RDI_PCK in the bit stream output from the buffer 30 by the generated NV_PCK (see, FIG. 4), and outputs the obtained bit stream to the buffer 50. The buffer 50 stores the received bit stream and then outputs the bit stream to the stream rewriting unit 62.

The stream rewriting unit 62 performs stream rewriting. Specifically, the stream rewriting unit 62 rewrites a time stamp and removes a PES_extension_field with respect to the bit stream input from the second buffer 50, based on the stream analysis information SI, and outputs a bit stream DV conforming to the DVD-video standard to the write unit 64.

In other words, the stream rewriting unit 62 detects a leading pack of a VOB for each type of packs based on structures of a VOB and VOBUs and SCR included in the stream analysis information SI, subtracts the time indicated by an SCR in the leading pack of the VOB from time information such as an SCR in a Pack Header of a pack forming a bit stream, a PTS (Presentation Time Stamp) and a DTS (Decoding Time Stamp) in a Packet Header, and replaces the original SCR, PTS and DTS by the subtraction results. The stream rewriting unit 62 removes a PES_extension_field in each pack except for the leading pack of the VOB with respect to each type of packs, and outputs the obtained bit stream to the write unit 64.

Figure 13:
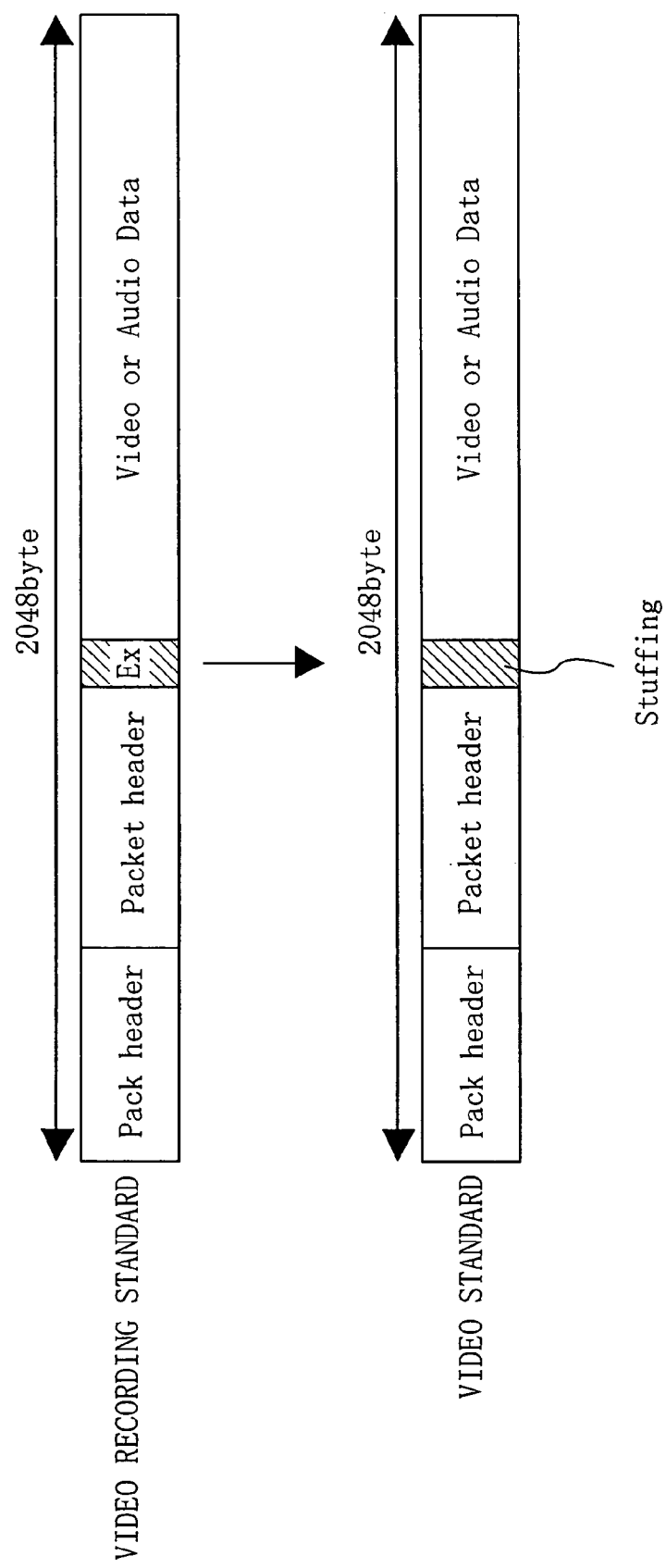
FIG. 13 is an explanatory diagram illustrating removal of a PES_extension_field using stuffing bytes.

FIG. 13 is an explanatory diagram illustrating removal of a PES_extension_field using stuffing bytes. In a packet including a PES_extension_field (indicated by Ex in FIG. 13), if no padding packet is provided and stuffing bytes are less than five bytes, the bits of the PES_extension_field_flag are rewritten to zero and then the portion corresponding to the PES_extension_field is overwritten with stuffing bytes.

Figure 14:
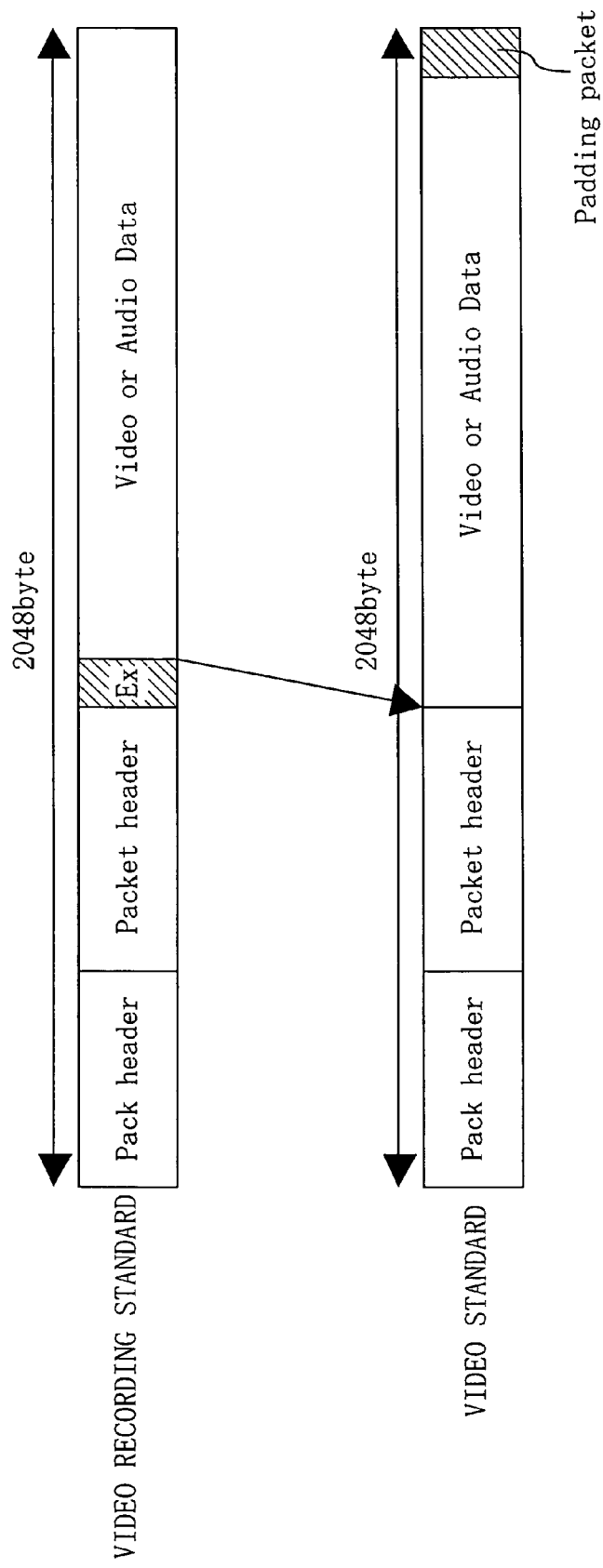
FIG. 14 is an explanatory diagram illustrating removal of a PES_extension_field using a padding packet.

FIG. 14 is an explanatory diagram illustrating removal of a PES_extension_field using a padding packet. In a packet including a PES_extension_field, if conditions that no padding packet is provided and stuffing bytes are less then 5 bytes are not satisfied, the bits of the PES_extension_field_flag are rewritten to zero and the PES_extension_field and the stuffing bytes are removed from the packet, and the removed data is compensated by a padding packet having the same length as the removed data.

The write unit 64 writes a bit stream output from the stream rewriting unit 62 in the recording medium 72 in the second storage device 70, as a bit stream DV.

Figure 15:
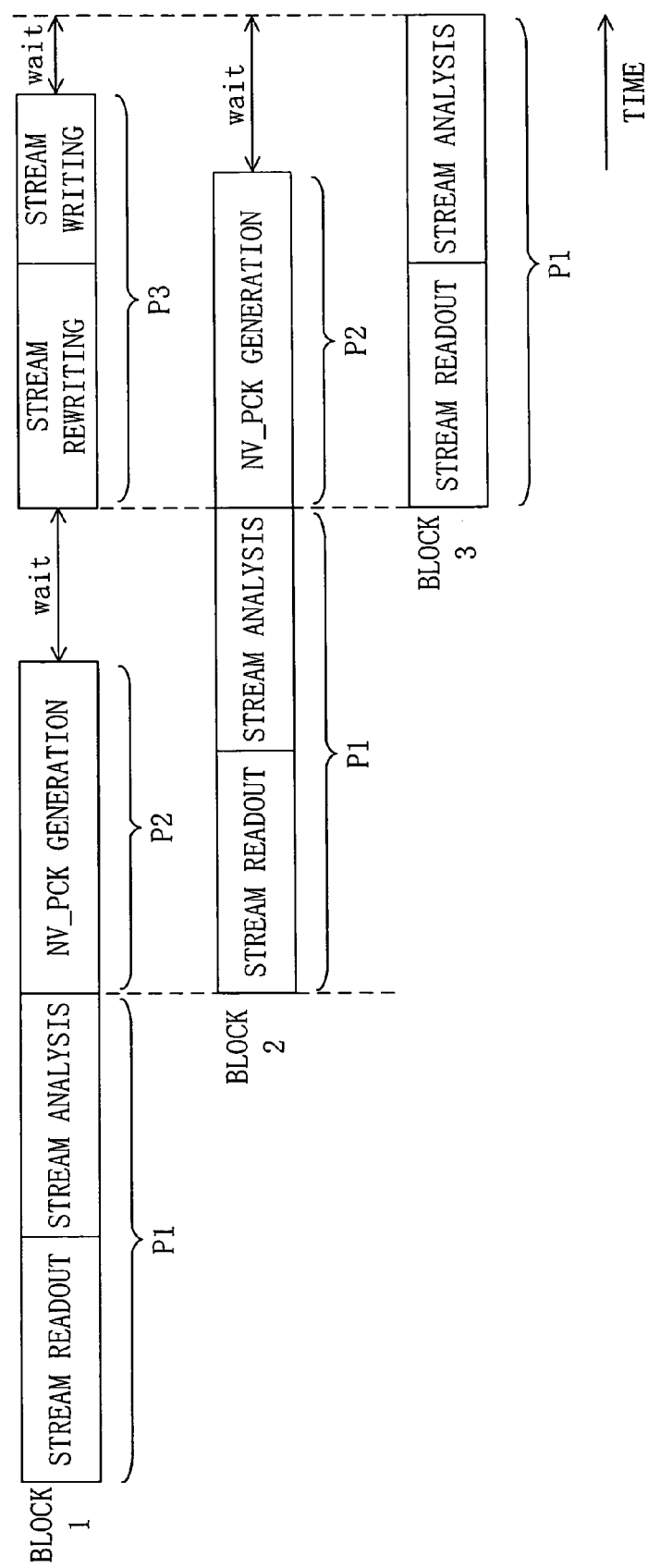
FIG. 15 is a timing chart showing an example of processing in the high speed dubbing apparatus illustrated in FIG. 1.

FIG. 15 is a timing chart showing an example of processing in the high speed dubbing apparatus 100 illustrated in FIG. 1. In FIG. 15, processes performed on a block 1, a block 2 and a block 3 and the time necessary for each of the processes are shown. The blocks 1 through 3 are continuous portions of a bit stream recorded on the recording medium 12 in the storage device 10, and each of the amounts of the blocks 1 through 3 is equal to the capacity of the buffer 30. In the high speed dubbing apparatus 100, a process such as reading is performed on each block.

Processing in the high speed dubbing apparatus 100 can be divided into processes P1, P2 and P3. The process P1 is a process starting from readout of a bit stream from the storage device 10 to storage of the bit stream in the buffer 30, and includes a stream reading process by the read unit 22 and a stream analysis process by the stream analyzer 26. The process P2 is a process starting from readout of a bit stream from the buffer 30 to storage of the bit stream in the buffer 50, and includes an NV_PCK generation process by the NV_PCK generator 40. The process P3 is a process starting from readout of a bit stream from the buffer 50 to storage of the bit stream in the storage device 70, and includes a stream rewriting process by the stream rewriting unit 62 and a stream writing process by the write unit 64.

The high speed dubbing apparatus 100 operates to perform the processes P1 through P3 in parallel, as shown in FIG. 15. The parallel processes P1 through P3 start at the same time. Accordingly, until one of the processes P1 through P3 requiring the longest time terminates, wait states exist after the other processes. In the case of FIG. 15, the time necessary for the process P1 (i.e., the stream reading process and the stream analysis process) is the longest among the processes P1 through P3, and this time corresponds to the time necessary for dubbing of a unit block. In this manner, pipeline operation is performed on the processes P1 through P3. In a case where no pipeline operation is performed, the total time necessary for the processes P1 through P3 is approximately equal to the time necessary for dubbing of a unit block. Accordingly, the high speed dubbing apparatus 100 illustrated in FIG. 1 enables high-speed dubbing.

An ATA (AT Attachment) or an ATAPI (AT Attachment Packet Interface), for example, connects the read unit 22 and the storage device 10 together or the write unit 64 and the storage device 70 together. The read unit 22 and the write unit 64 transfer data to/from the storage devices 10 and 70, respectively, as fast as possible using a command such as an UDMA (Ultra Direct Memory Access) in this interface.

FIG. 16 is a timing chart showing an example of data transfer between the read unit 22 and the storage device 10 illustrated in FIG. 1. In the case of data transfer using a command such as an UDMA, the time for a command issue sequence is needed before the transfer starts and the time for a command termination sequence is needed after the transfer is finished.

One VOBU includes one NV_PCK at the maximum. Accordingly, if the size of the buffers 30 and 50 is less than one VOBU, NV_PCK generation is not performed in some cases, so that processing efficiency can decrease because of overhead. In view of this, the size of the buffers 30 and 50 is set enough to store at least a bit stream of one VOBU. This ensures NV_PCK generation.

As the capacity of the buffer 30 increases, overhead associated with an ATA command or an ATAPI command as shown in FIG. 16 decreases, and the efficiency of transfer is enhanced. However, if the capacity of the buffer is larger than that of the cache memory 16 in the storage device 10, the amount of data transferred at a time exceeds the capacity of the cache memory 16 and readout from the recording medium 12 must be performed for every capacity of the cache memory 16. In this case, data transfer is repeated at every time T as shown in FIG. 16.

If data transfer is divided and performed, a period during which reading from the recording medium 12 is performed is a wait time during which no data transfer is performed, so that transfer speed does not increase. In view of this, the capacity of the buffer 30 is set at a value equal to or less than the capacity of the cache memory 16. Then, data transfer between the cache memory 16 and the read unit 22 is not divided and the wait time is reduced. In particular, the capacity of the buffer 30 is preferably equal to that of the cache memory 16. This is because it is possible to reduce overhead associated with the ATA command or the ATAPI command, while reducing the wait time.

Likewise, with respect to data transfer between the write unit 64 and the storage device 70, data transfer is divided and performed for every capacity of the cache memory 76. Accordingly, the capacity of the buffer 50 is equal to or less than the capacity of the cache memory 76 and is preferably equal to the capacity of the cache memory 76.

Figure 17A:
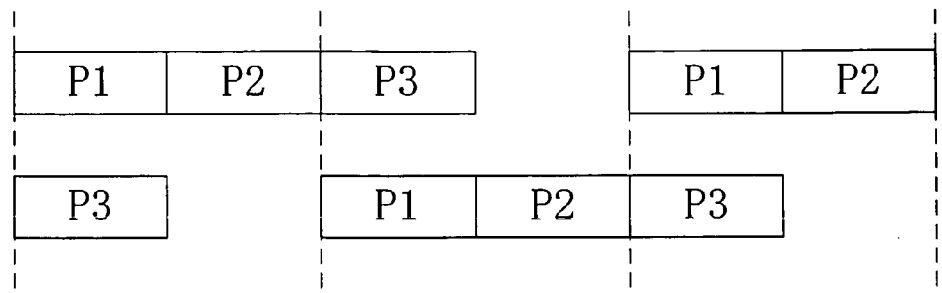
FIGS. 17(a) through (c) are timing charts showing examples of the case of performing two processes in parallel in the high speed dubbing apparatus illustrated in FIG. 1.
Figure 17B:
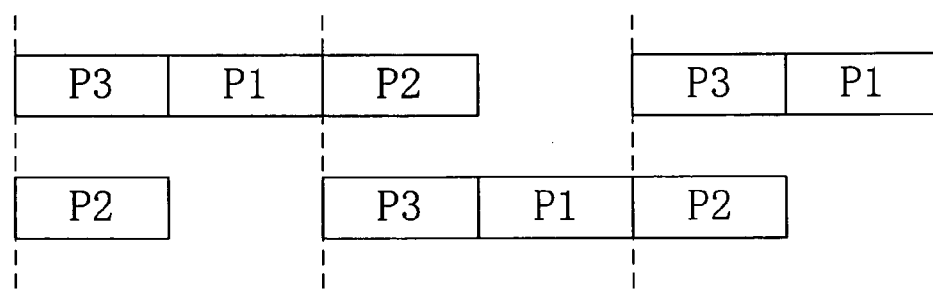
Figure 17C:
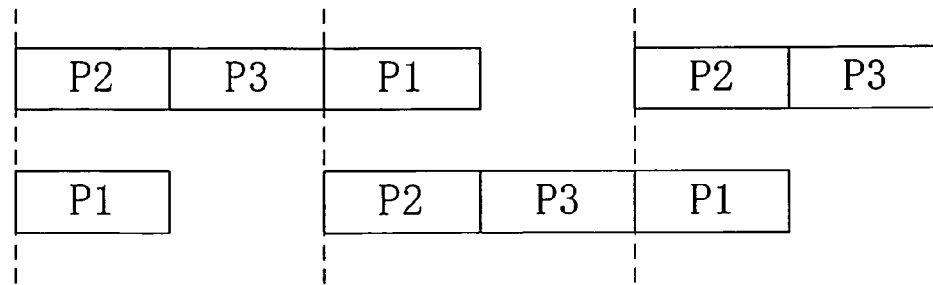

FIGS. 17(a), (b) and (c) are timing charts showing examples of the case of performing two processes in parallel in the high speed dubbing apparatus 100 illustrated in FIG. 1. The case of performing three processes in parallel in the high speed dubbing apparatus 100 has been described with reference to FIG. 15. Alternatively, two processes may be performed in parallel, as shown in FIGS. 17(a) through (c). It is herein assumed that the periods necessary for the respective processes P1 through P3 are the same for simplicity.

FIG. 17(a) shows a case where the process P3 is performed in parallel while the process P1 or P2 shown in FIG. 15 is performed. FIG. 17(b) shows a case where the process P2 is performed in parallel while the process P3 or P1 shown in FIG. 15 is performed. FIG. 17(c) shows a case where the process P1 is performed in parallel while the process P2 or P3 shown in FIG. 15 is performed.

The stream analysis information SI may be accumulated in the recording medium 12 together with a bit stream. In such a case, the stream analysis information SI is read out from the recording medium 12 and is used.

In this manner, in the high speed dubbing apparatus 100 illustrated in FIG. 1, the buffers 30 and 50 allow a read process from the storage device 10 or a write process in the storage device 70 to be performed in parallel with another process. Accordingly, a dubbing process in which a bit stream conforming to the DVD-VR standard format is read out and is converted into a bit stream conforming to the DVD-video standard format to be written is performed at high speed.

Embodiment 2

FIG. 18 is a block diagram illustrating an example of a configuration of a high speed dubbing apparatus according to a second embodiment of the present invention. The high speed dubbing apparatus 200 illustrated in FIG. 18 includes a buffer checking unit 80, in addition to the components of the high speed dubbing apparatus 100 illustrated in FIG. 1. The first and second buffers 30 and 50 are replaced with first and second buffers 230 and 250. The other components are the same as described with reference to FIG. 1, and description thereof will be omitted.

The buffer checking unit 80 reads a sufficient amount of data from a storage device 10 while a read unit 22 does not operate. At this time, data in an amount corresponding to the capacity of a cache memory 16 in the storage device 10 is transferred at each time. If the size of a data block (data transfer (N) in FIG. 16) to be transferred first is equal to the size of a data block (e.g., data transfer (M) in FIG. 16) to be transferred next or later, this size is considered the capacity of the cache memory 16. Accordingly, the buffer checking unit 80 defines this size as the buffer size of a buffer 230, and outputs a signal indicating the buffer size to the buffer 230. The buffer 230 adjusts the capacity thereof to the size specified by the signal indicating the buffer size.

If the size of a data block (data transfer (N) in FIG. 16) to be transferred first differs from the size of a data block (e.g., data transfer (M) in FIG. 16) to be transferred next or later, the buffer checking unit 80 defines the most frequent size as the buffer size of the buffer 230.

In the same manner, the buffer checking unit 80 writes a sufficient amount of data in an unused region of a storage device 70 while a write unit 64 does not operate. At this time, data in an amount corresponding to the capacity of a cache memory 76 in the storage device 70 is transferred at each time. If the size of a data block to be transferred first is equal to the size of a data block to be transferred next or later, the buffer checking unit 80 defines this size as the buffer size of a buffer 250, and outputs a signal indicating the buffer size to the buffer 250. The buffer 250 adjusts the capacity thereof to the size specified by the signal indicating the buffer size.

If the size of a data block to be transferred first differs from the size of a data block to be transferred next or later, the buffer checking unit 80 defines the most frequent size as the buffer size of the buffer 250.

If the defined buffer size differs between the buffers 230 and 250, the buffer checking unit 80 defines the smaller buffer size as the buffer size of the buffers 230 and 250.

In this manner, in the high speed dubbing apparatus illustrated in FIG. 18, the size of a buffer is optimized according to the configuration of a storage device in which a bit stream is stored, thus ensuring reduction of the time necessary for dubbing. In addition, in the case of changing a storage device, e.g., the case of replacing a hard disk drive, the size of a buffer is also allowed to be optimized.

If the time necessary for transferring one data block is the time T as shown in FIG. 15, the interval between stream reading in FIG. 16 or between stream writing is not shorter than the time T. Accordingly, pipeline operation needs to be kept waiting so as to prevent the length corresponding to one stage of pipeline from being smaller than the time T.

Embodiment 3

Figure 19:
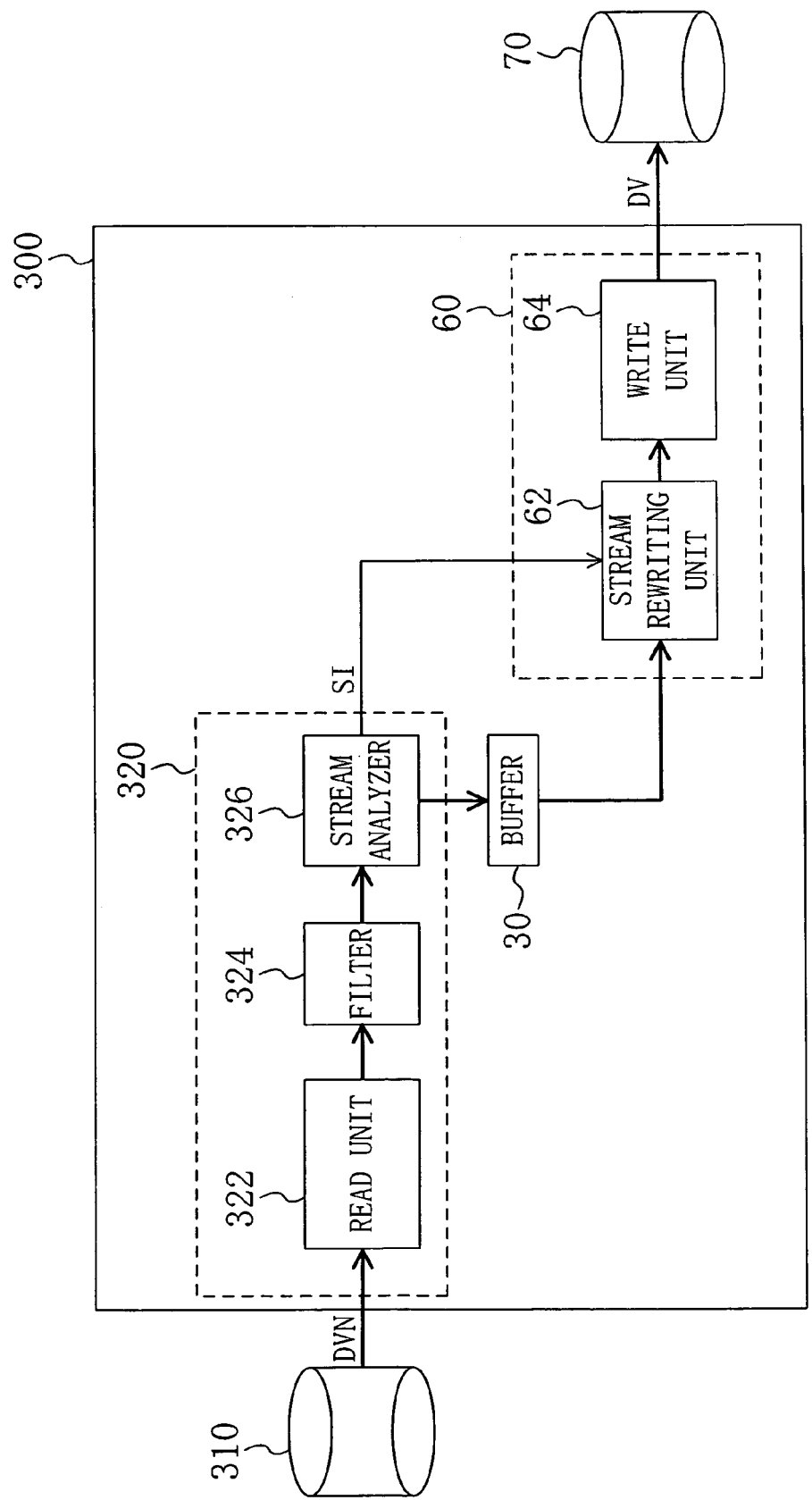
FIG. 19 is a block diagram illustrating an example of a configuration of a high speed dubbing apparatus according to a third embodiment of the present invention.

FIG. 19 is a block diagram illustrating an example of a configuration of a high speed dubbing apparatus according to a third embodiment of the present invention. The high speed dubbing apparatus 300 illustrated in FIG. 19 includes a storage device 310 and a read section 320 instead of the storage device 10 and the read section 20, respectively, in the high speed dubbing apparatus 100 illustrated in FIG. 1 and does not include the navigation pack generator 40 and the second buffer 50. The storage device 310 has a configuration similar to that of the storage device 10. The read section 320 includes: a read unit 322; a filter 324; and a stream analyzer 326. The other components are the same as described with reference to FIG. 1, and description thereof will be omitted.

FIG. 20 is an explanatory diagram illustrating an example of a format of a bit stream output from the storage device 310 illustrated in FIG. 19. The storage device 310 reads a bit stream from a recording medium and outputs the bit stream to the read unit 322 as a bit stream DVN. The bit stream DVN is a bit stream in which an NV_PCK (i.e., "N" in FIG. 20) is added before an RDI_PCK (i.e., "R" in FIG. 20) in a bit stream conforming to the general DVD-VR standard.

The recording medium from which data is read out by the storage device 310 stores a bit stream including both an RDI_PCK and a previously-generated NV_PCK. The RDI_PCK or the NV_PCK may be stored in a region different from regions in which other packs of the bit stream are stored. For the RDI_PCK and the NV_PCK, the same value is used as common variables (e.g., SCR).

In the case of usual playback, for example, i.e., if a bit stream conforming to the DVD-VR standard is needed, the filter 324 removes an NV_PCK from a bit stream output from the read unit 322 and outputs the resultant bit stream to the stream analyzer 326. In the case of high-speed dubbing, i.e., if a bit stream conforming to the DVD-video standard is written in a recording medium, the RDI_PCK is removed from the bit stream output from the read unit 322 and the resultant bit stream is output to the stream analyzer 326.

The stream analyzer 326 is the same as the stream analyzer 26 in FIG. 1 except for that data for NV_PCK generation is unnecessary.

In the high speed dubbing apparatus illustrated in FIG. 19, an NV_PCK does not need to be generated during dubbing. Accordingly, the process P2 in FIG. 15 is unnecessary and the processes P1 and P3 in FIG. 15 are performed in parallel. As a result, the dubbing speed is not limited by the process P2.

In this manner, a bit stream to which an NV_PCK is previously added is stored in the storage device 310, generation of an NV_PCK is unnecessary and the second buffer 50 illustrated in FIG. 1 is not needed. Though the amount of the bit stream to be stored in the storage device 310 is increased because of the addition of the NV_PCK, no significant influence occurs because only one NV_PCK is added for each one VOBU (0.4 seconds or more).

In the foregoing embodiments, the time necessary for a dubbing process in which a bit stream conforming to the DVD-VR standard format is read out and a bit stream conforming to the DVD-video standard format is written is reduced.

Embodiment 4

Figure 21:
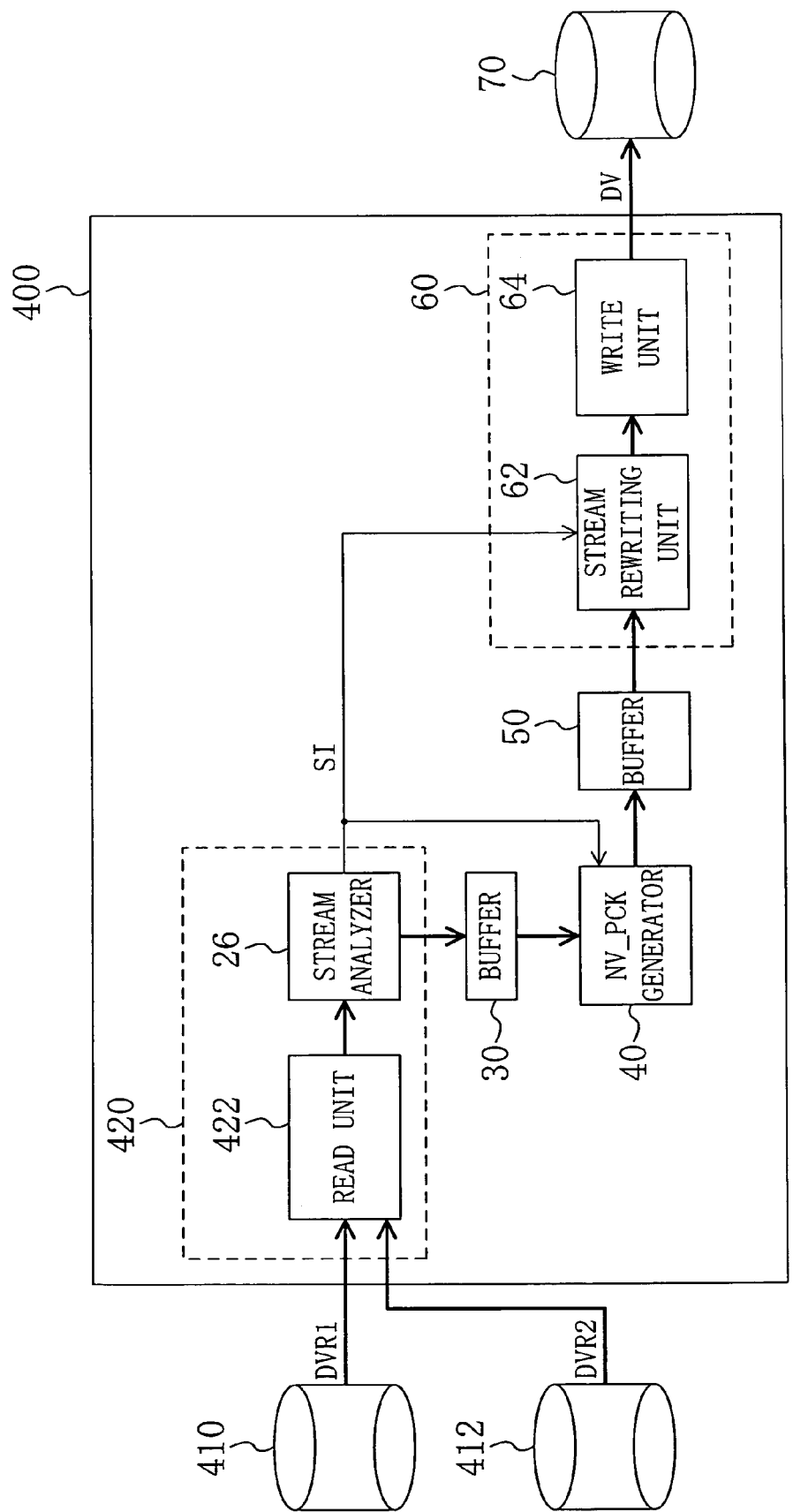
FIG. 21 is a block diagram illustrating an example of a configuration of a high speed dubbing apparatus according to a fourth embodiment of the present invention.

FIG. 21 is a block diagram illustrating an example of a configuration of a high speed dubbing apparatus according to a fourth embodiment of the present invention. The high speed dubbing apparatus 400 illustrated in FIG. 21 includes first storage devices 410 and 412 and a read section 420 instead of the storage device 10 and the read section 20 of the high speed dubbing apparatus 100 illustrated in FIG. 1. The storage devices 410 and 412 are similar to the storage device 10 except for that continuous data constituting a content is divided and stored in two storage devices. The read section 420 includes: a read unit 422; and a stream analyzer 26. The other components are the same as described with reference to FIG. 1, and description thereof will be omitted.

Figure 22:
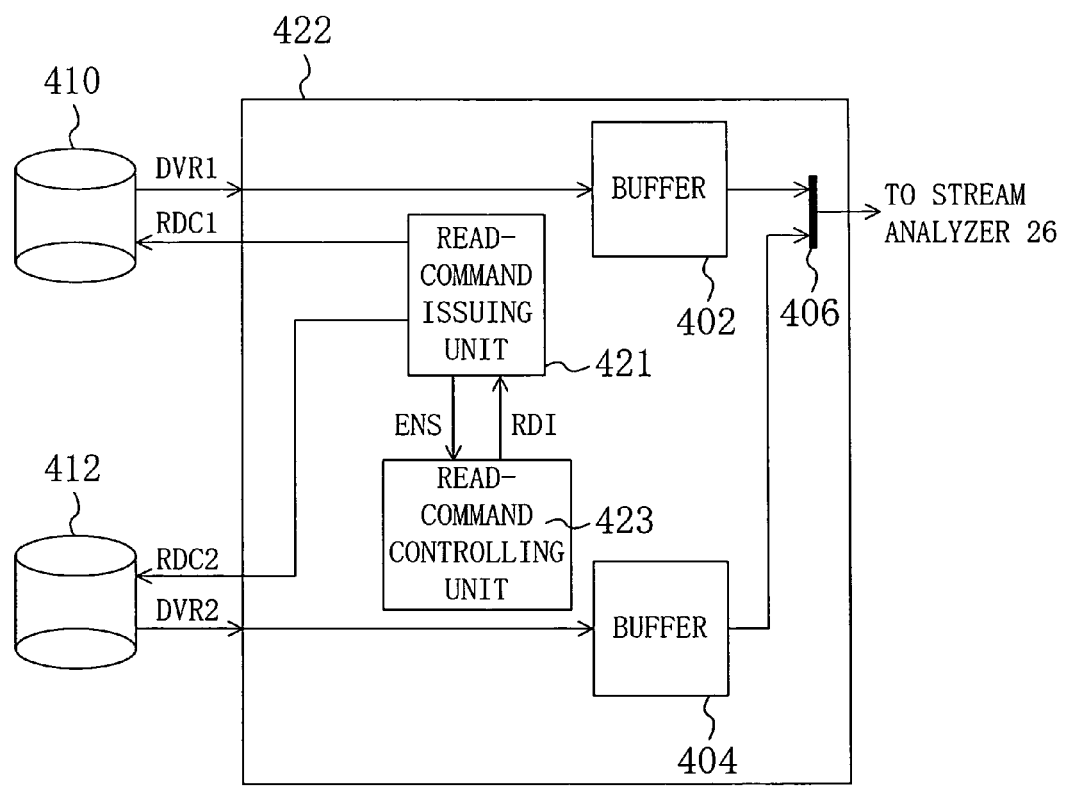
FIG. 22 is a block diagram illustrating a configuration of a read unit illustrated in FIG. 21.

FIG. 22 is a block diagram illustrating a configuration of the read unit 422 illustrated in FIG. 21. The read unit 422 includes: a read-command issuing unit 421; a read-command controlling unit 423; buffers 402 and 404; and a selector 406.

As the read-command controlling unit 23 illustrated in FIG. 11, a read-command controlling unit 423 issues a read instruction RDI to the read-command issuing unit 421. Upon reception of the read instruction RDI, the read-command issuing unit 421 issues read commands RDC1 and RDC2 to the respective storage devices 410 and 412 at the same time.

Upon reception of the read command RDC1, the storage device 410 reads a content in the DVD-VR standard format, and outputs the content to the buffer 402 as a bit stream DVR1. Upon reception of the read command RDC2, the storage device 412 reads a content in the DVD-VR standard format, and outputs the content to the buffer 404 as a bit stream DVR2. That is, the storage devices 410 and 412 perform reading in parallel.

The buffers 402 and 404 output the received data to the selector 406. The selector 406 alternately selects data from the buffers 402 and 404, and outputs the selected data to the stream analyzer 26 as a bit stream conforming to the DVD-VR standard. Even if the read commands RDC1 and RDC2 are issued at a time, the storage devices 410 and 412 do not always finish reading at a time. Accordingly, the buffers 402 and 404 have a buffer capacity enough to absorb the difference in processing termination time. The read-command issuing unit 421 outputs an end signal ENS to the read-command controlling unit 423 when both data transmission to the buffer 402 and data transmission to the buffer 404 are terminated.

Figure 23:
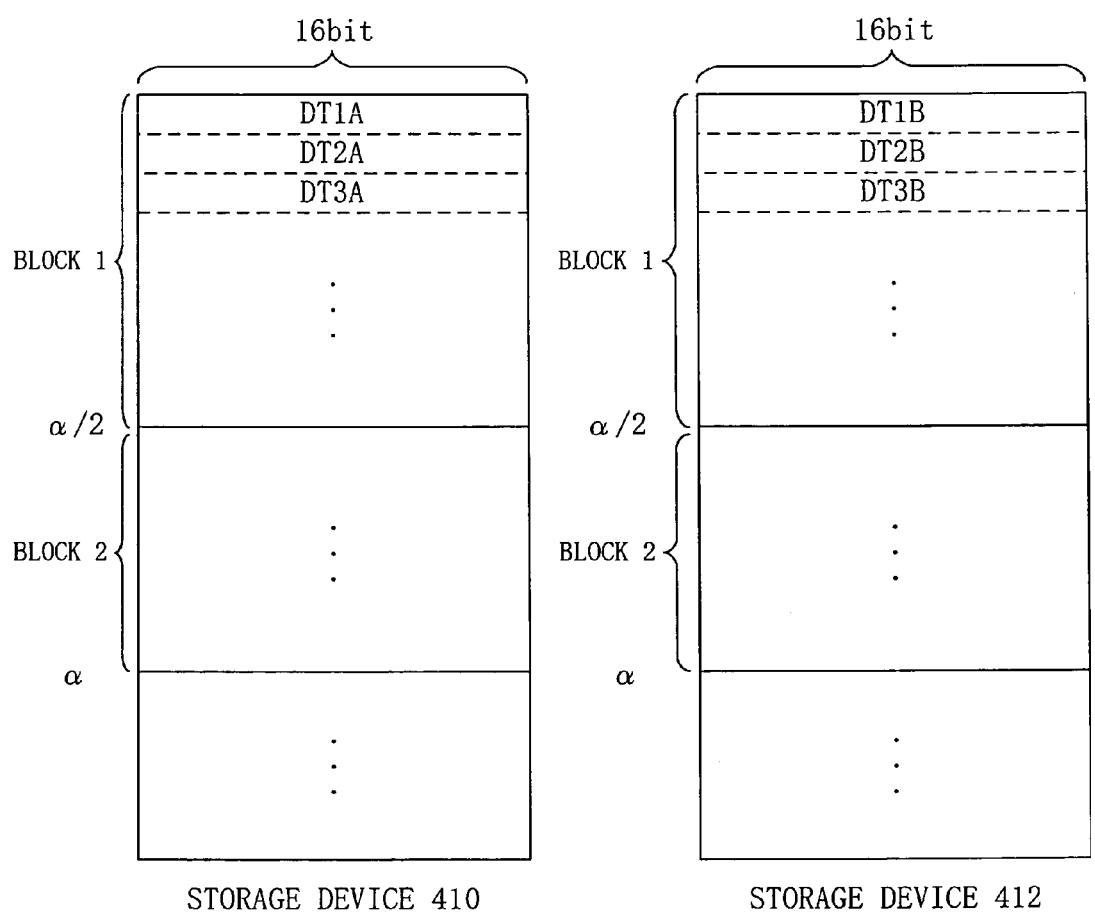
FIG. 23 is an explanatory diagram illustrating storage states of a content in the DVD-VR standard format in two storage devices illustrated in FIG. 22.

FIG. 23 is an explanatory diagram illustrating storage states of a content in the DVD-VR standard format in the two storage devices 410 and 412 illustrated in FIG. 22. In this embodiment, data is managed in units of 32 bits. The storage device 410 stores the higher-order 16 bits in each 32-bit data, whereas the storage device 412 stores the lower-order 16 bits in each 32-bit data.

Specifically, the higher-order 16-bit data DT1A and the lower-order 16-bit data DT1B constituting 32-bit data are stored in the respective storage devices 410 and 412, and the higher-order 16-bit data DT2A and the lower-order 16-bit data DT2B constituting next 32-bit data are stored in the respective storage devices 410 and 412. In other words, the successive 16-bit data DT1A, DT1B, DT2A, DT2B, . . . are alternately stored in the storage devices 410 and 412.

For example, suppose the capacity of one block is a words, a region corresponding to α/2 words is occupied for this block in each of the storage devices 410 and 412. In view of this, the read-command issuing unit 421 reduces an address specified by the received read instruction RDI by half and specifies the address in the read commands RDC1 and RDC2.

In the foregoing example, data conforming to the DVD-VR standard is divided into units of 16 bits and stored. Alternatively, the data may be divided into units of, for example, 8 bits or other number of bits to be stored.

Figure 24:
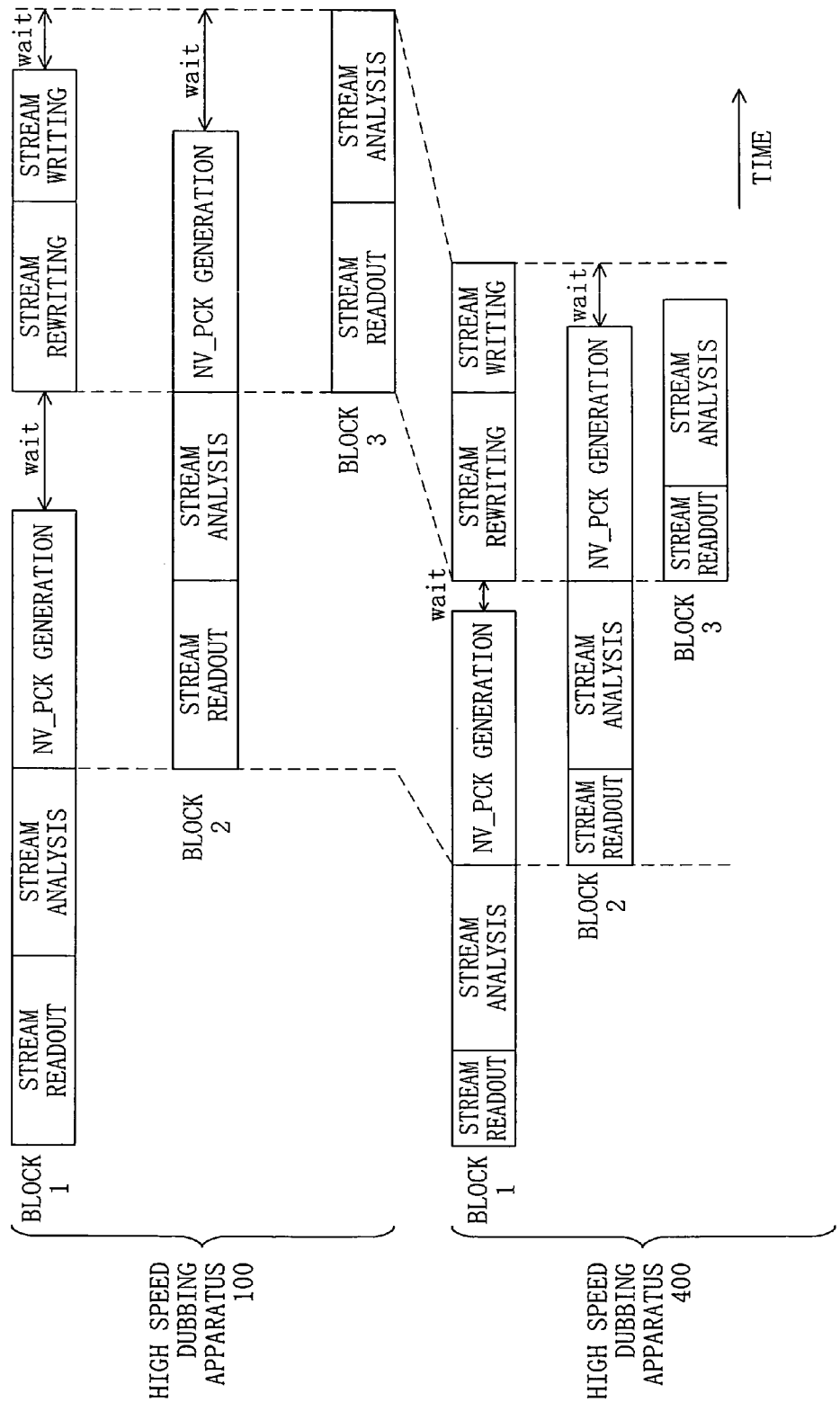
FIG. 24 is a timing chart showing examples of processing in the high speed dubbing apparatus illustrated in FIG. 21.

FIG. 24 is a timing chart showing an example of processing in the high speed dubbing apparatus 400 illustrated in FIG. 21. For comparison, a timing chart for the high speed dubbing apparatus 100 illustrated in FIG. 1 is also shown in an upper portion of FIG. 24. In the high speed dubbing apparatus 400, data is simultaneously read out from the storage devices 410 and 412 in parallel, so that the time necessary for reading a stream is reduced by approximately half. As a result, a dubbing process is performed at higher speed than in the high speed dubbing apparatus 100 illustrated in FIG. 1.

Embodiment 5

Figure 25:
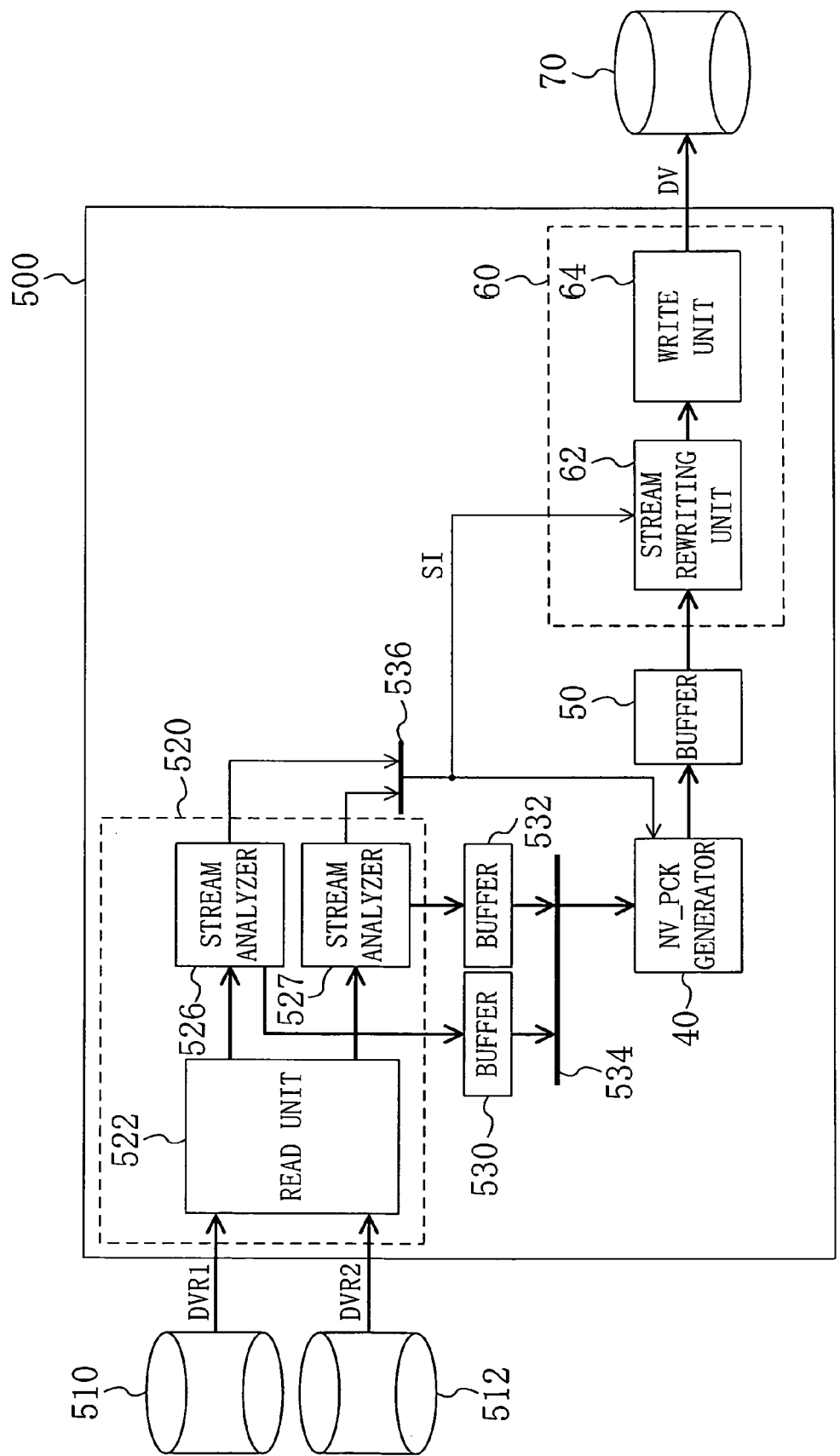
FIG. 25 is a block diagram illustrating an example of a configuration of a high speed dubbing apparatus according to a fifth embodiment of the present invention.

FIG. 25 is a block diagram illustrating an example of a configuration of a high speed dubbing apparatus according to a fifth embodiment of the present invention. The high speed dubbing apparatus 500 illustrated in FIG. 25 includes first storage devices 510 and 512, a read section 520 and buffers 530 and 532, instead of the first storage device 10, the read section 20 and the first buffer 30 of the high speed dubbing apparatus 100 illustrated in FIG. 1 and further includes selectors 534 and 536. The storage devices 510 and 512 are similar to the storage device 10 except for that continuous data constituting a content is divided and stored in two storage devices. The read section 520 includes: a read unit 522; and stream analyzers 526 and 527. The other components are the same as described with reference to FIG. 1, and description thereof will be omitted.

Figure 26:
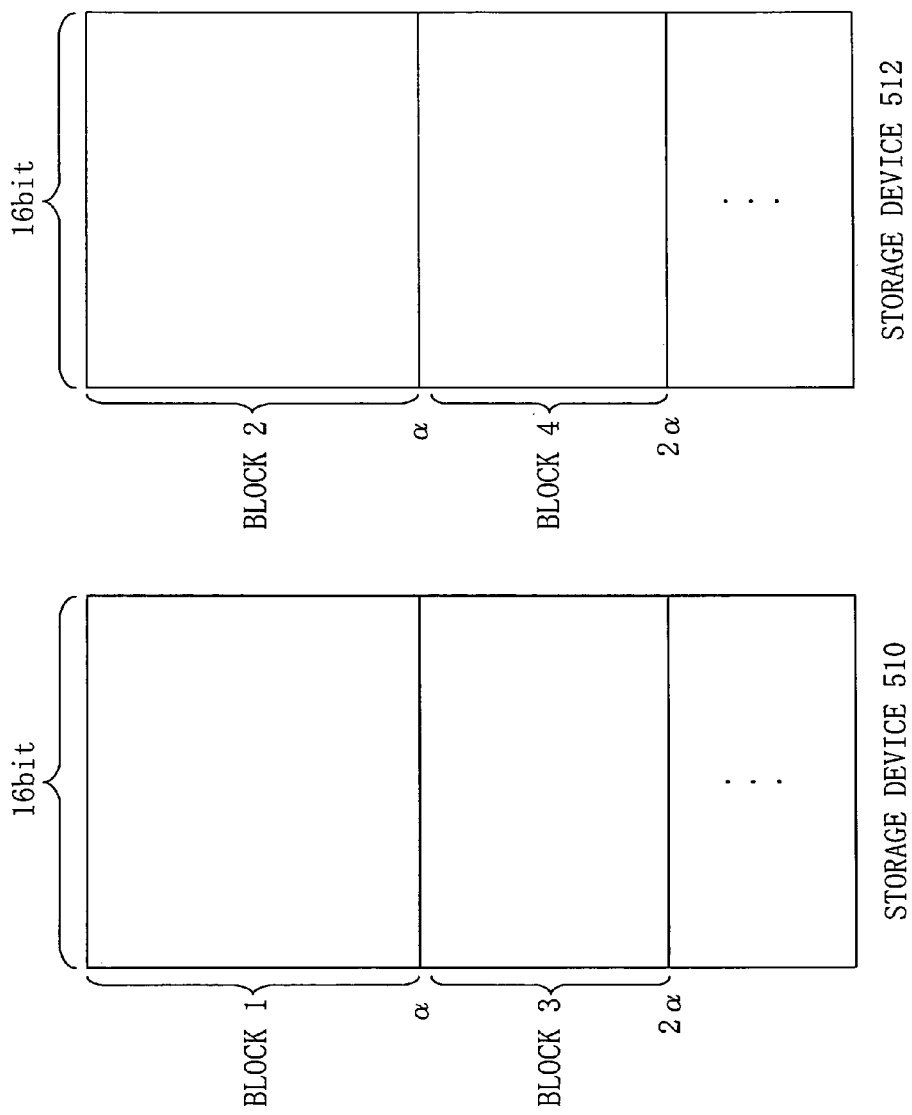
FIG. 26 is an explanatory diagram illustrating storage states of a content in the DVD-VR standard format in two storage devices illustrated in FIG. 25.

FIG. 26 is an explanatory diagram illustrating storage states of a content in the DVD-VR standard format in the two storage devices 510 and 512 illustrated in FIG. 25. The storage device 510 stores data in odd-numbered blocks and the storage device 512 stores data in even-numbered blocks. That is, successive blocks are alternately stored in the storage devices 510 and 512. Accordingly, as compared to a case where only one storage device stores data, half of the region of each of the storage devices 510 and 512 is occupied. The respective blocks are subjected to alignment in processing units (VOBUs) for high-speed dubbing. That is, the size of each block is an integral multiple of a VOBU.

Figure 27:
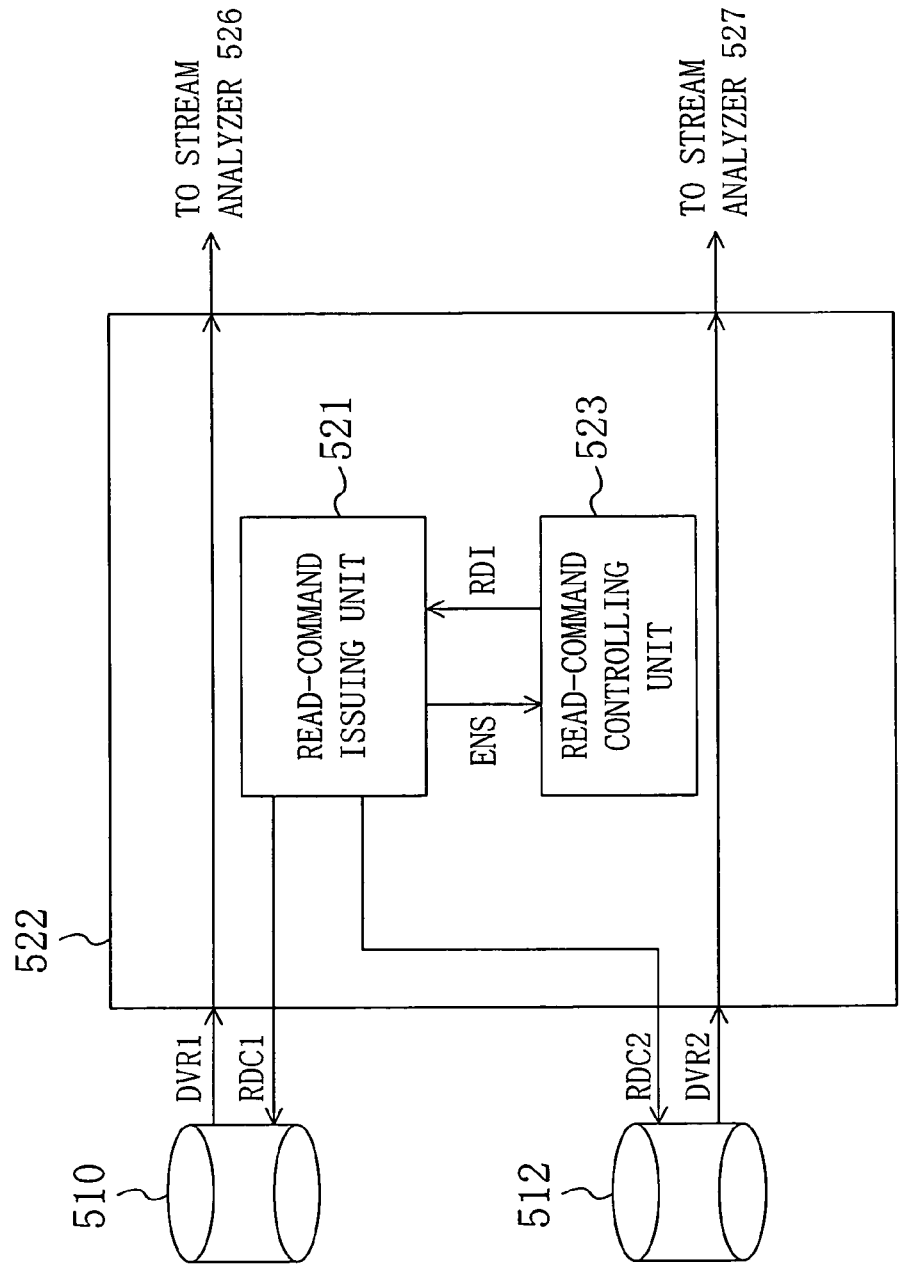
FIG. 27 is a block diagram illustrating a configuration of a read unit illustrated in FIG. 25.

FIG. 27 is a block diagram illustrating a configuration of the read unit 522 illustrated in FIG. 25. The read unit 522 includes: a read-command issuing unit 521; and a read-command controlling unit 523.

The read-command controlling unit 523 issues a read instruction RDI to the read-command issuing unit 521. Upon reception of the read instruction RDI, if a specified address is an address indicating an odd-numbered block, the read-command issuing unit 521 issues a read command RDC1 to the storage device 510, whereas if the specified address is an address indicating an even-numbered block, the read-command issuing unit 521 issues a read command RDC2 to the storage device 512.

Upon reception of the read command RDC1, the storage device 510 reads a content in the DVD-VR standard format and outputs the content to the stream analyzer 526 as a bit stream DVR1. Upon reception of the read command RDC2, the storage device 512 reads a content in the DVD-VR standard format and outputs the content to the stream analyzer 527 as a bit stream DVR2. The read-command issuing unit 521 outputs an end signal ENS to the read-command controlling unit 523 at every termination of an issue of the read command RDC1 or RDC2.

The stream analyzers 526 and 527 analyze the respective bit streams DVR1 and DVR2, and output the obtained stream analysis information to the selector 536. The stream analyzers 526 and 527 output the bit streams to the respective buffers 530 and 532.

The selector 536 selects the stream analysis information output from one of the stream analyzers 526 and 527, and outputs the selected information to an NV_PCK generator 40 and a stream rewriting unit 62. The buffers 530 and 532 output the input bit streams to the selector 534. The selector 534 selects a bit stream from one of the stream analyzers 526 and 527 selected by the selector 536, and outputs the bit stream to the NV_PCK generator 40.

Figure 28:
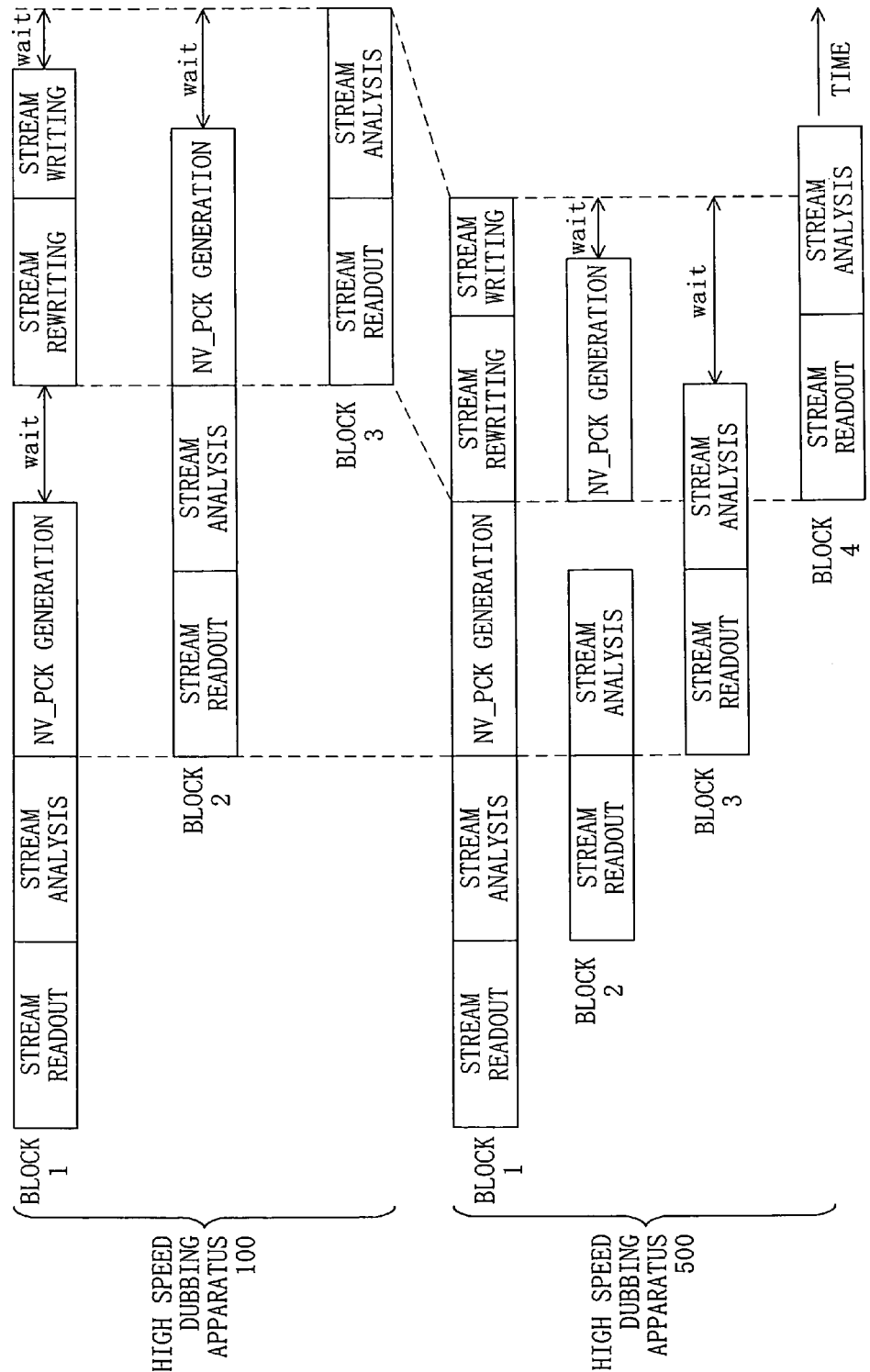
FIG. 28 is a timing chart showing examples of processing in the high speed dubbing apparatus illustrated in FIG. 25.

FIG. 28 is a timing chart showing an example of processing in the high speed dubbing apparatus 500 illustrated in FIG. 25. As shown in FIG. 28, in the high speed dubbing apparatus 100 illustrated in FIG. 1, until stream analysis for one block is terminated, a stream in the next block cannot be read out. In addition, if the time necessary for stream readout and stream analysis is longer than either one of the time necessary for stream rewriting and stream storage and the time necessary for NV_PCK generation, a wait time is generated.

In the high speed dubbing apparatus 500 illustrated in FIG. 25, stream readout and stream analysis is allowed to be performed before stream readout and stream analysis for the previous block is terminated, as illustrated in FIG. 28. Accordingly, the wait time is reduced.

Embodiment 6

Figure 29:
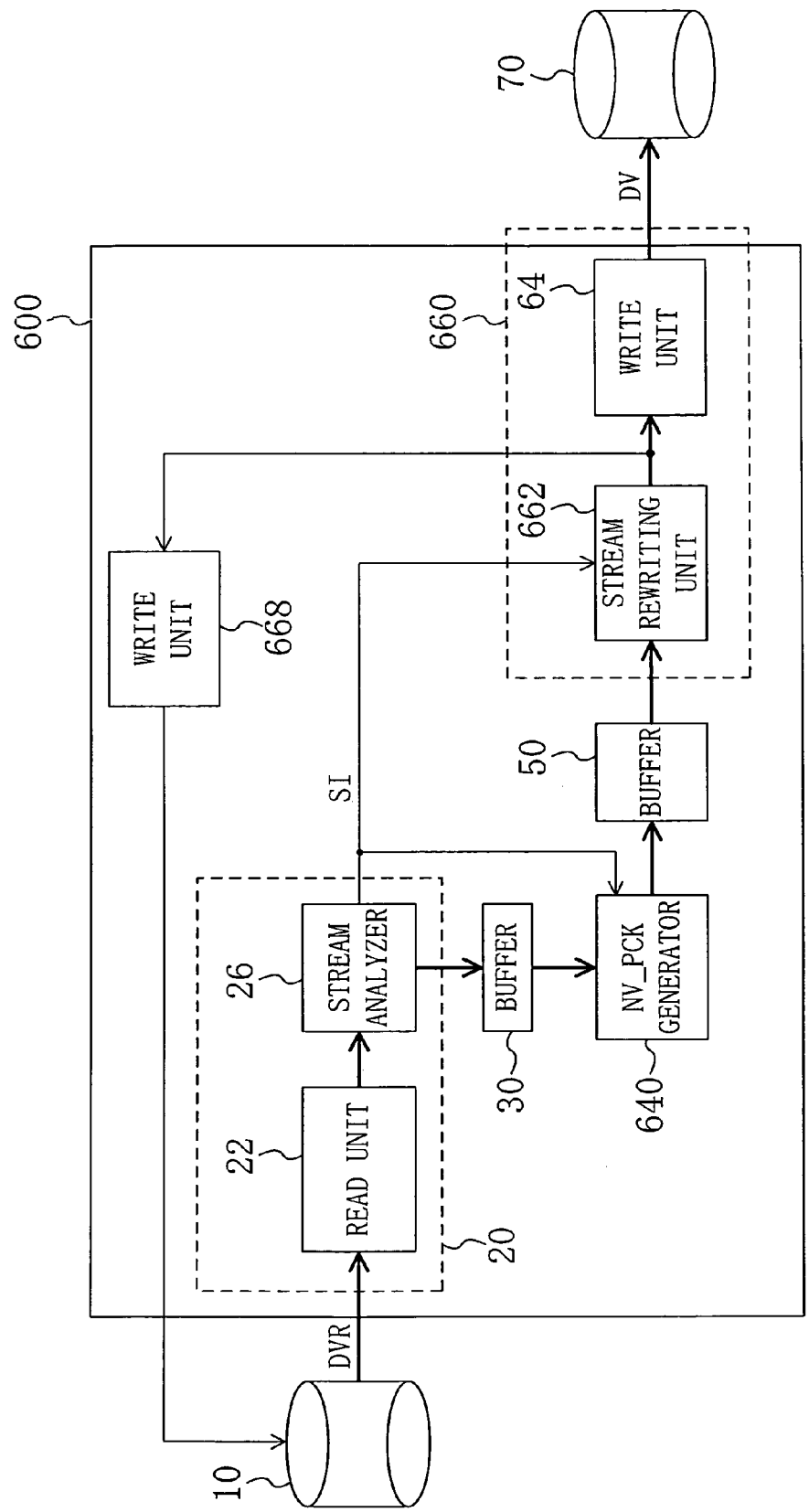
FIG. 29 is a block diagram illustrating an example of a configuration of a high speed dubbing apparatus according to a sixth embodiment of the present invention.

FIG. 29 is a block diagram illustrating an example of a configuration of a high speed dubbing apparatus according to a sixth embodiment of the present invention. The high speed dubbing apparatus 600 illustrated in FIG. 29 includes an NV_PCK generator 640 and a write section 660 instead of the NV_PCK generator 40 and the write section 60, respectively, of the high speed dubbing apparatus 100 illustrated in FIG. 1 and further includes a write unit 668. The write section 660 includes a stream rewriting unit 662 and a write unit 64. The other components are the same as described with reference to FIG. 1, and description thereof will be omitted.

The stream rewriting unit 662 is different from the stream rewriting unit 62 illustrated in FIG. 1 in that upon reception of a stream in the DVD-video standard format, the stream rewriting unit 662 adds a PES_extension_field to the first-input NV_PCK and performs replacement of SCRs. The NV_PCK generator 640 is different from the NV_PCK generator 40 illustrated in FIG. 1 in that an NV_PCK is corrected and output when a stream in the DVD-video standard format is input.

In high-speed dubbing of a stream in the DVD-VR standard format, the NV_PCK generator 640 generates an NV_PCK and outputs a stream to the stream rewriting unit 662 through a second buffer 50, in the same manner as the NV_PCK generator 40 illustrated in FIG. 1.

At this time, the stream rewriting unit 662 rewrites an SCR, a PTS and a DTS in the same manner as the stream rewriting unit 62 illustrated in FIG. 1, thereby converting the input stream into a stream in the DVD-video standard format and outputting the resultant stream. The stream in the DVD-video standard format output from the stream rewriting unit 662 is output not only to the write unit 64 but also to the write unit 668. The write unit 668 writes the input stream in the DVD-video standard format in a storage device 10. At this time, the input stream is written in a region different from a region where a stream in the DVD-VR standard format before conversion is stored in the storage device 10.

After termination of high-speed dubbing of a stream in the DVD-VR standard format, to perform high-speed dubbing of the entire portion of the same content again, a converted stream recorded in the storage device 10 is read out by a read unit 22 and then the write unit writes the stream in a storage device 70 without change. That is, in this case, the NV_PCK generator 640 and the stream rewriting unit 662 do not rewrite the stream.

To perform high-speed dubbing of a portion of the same content again after termination of high-speed dubbing of a stream in the DVD-VR standard format, the NV_PCK generator 640 and the stream rewriting unit 662 perform the following processing. That is, the NV_PCK generator 640 modifies time information such as an SCR, a PTS and a DTS, for example, included in an NV_PCK in a converted stream read out by the read unit 22, and sends the modified stream to the stream rewriting unit 662 through the buffer 50. The stream rewriting unit 662 removes PES_extension_fields when necessary in such a manner that a PES_extension_field is present only in the leading pack of each of a video content, an audio content and a subpicture content. The stream rewriting unit 662 also modifies the SCR, the PTS and the DTS again.

In this manner, in the high speed dubbing apparatus 600 illustrated in FIG. 29, the stream subjected to format conversion is stored in the storage device 10 and is used as a cached stream. Accordingly, the time necessary for processing on an NV_PCK and stream rewriting is reduced, so that the dubbing speed in a case where dubbing is performed multiple times is increased.

Embodiment 7

Figure 30:
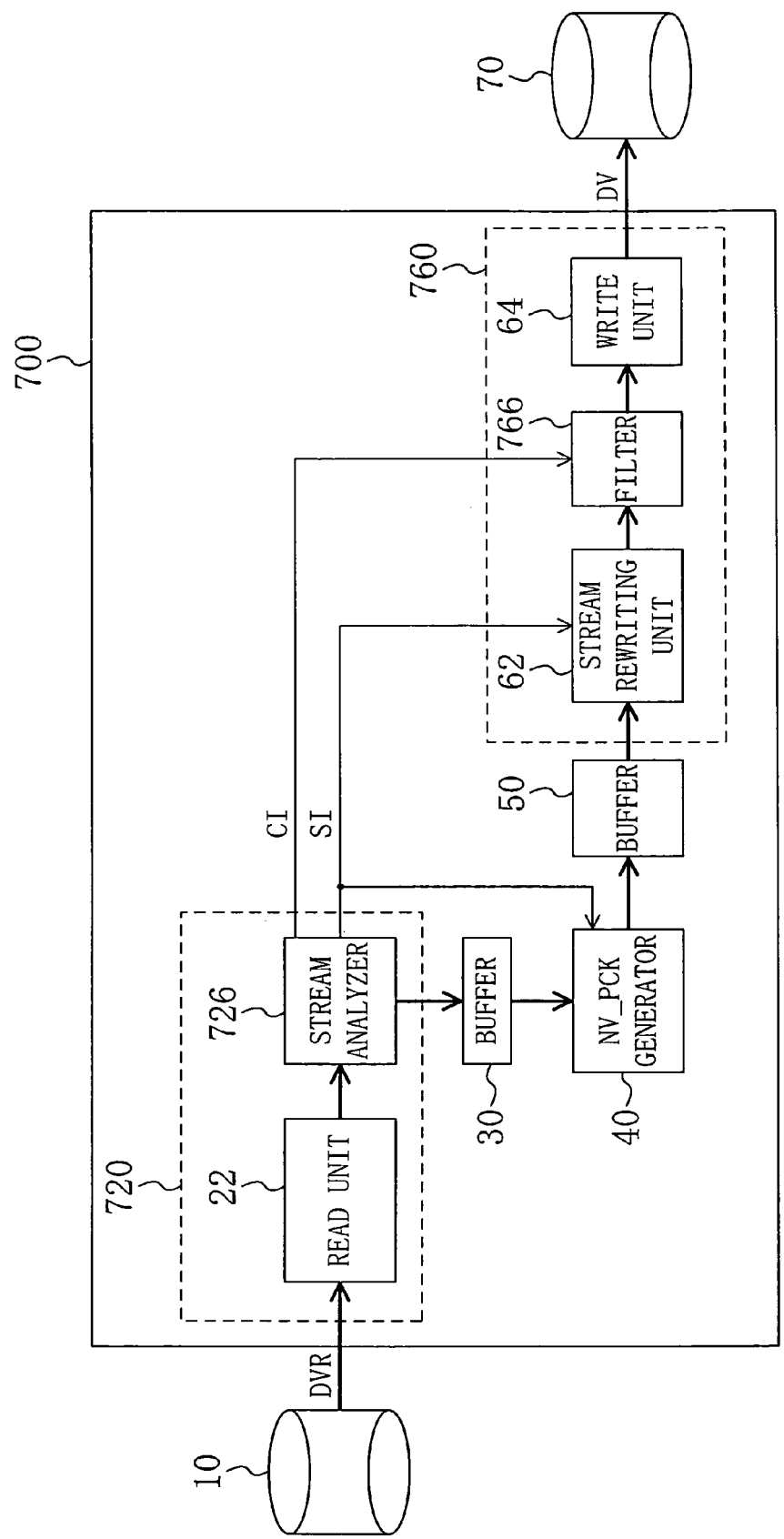
FIG. 30 is a block diagram illustrating an example of a configuration of a high speed dubbing apparatus according to a seventh embodiment of the present invention.

FIG. 30 is a block diagram illustrating an example of a configuration of a high speed dubbing apparatus according to a seventh embodiment of the present invention. The high speed dubbing apparatus 700 illustrated in FIG. 30 includes a read section 720 and a write section 760, instead of the read section 20 and the write section 60, respectively, of the high speed dubbing apparatus 100 illustrated in FIG. 1. The read section 720 includes: a read unit 22; and a stream analyzer 726. The write section 760 includes: a stream rewriting unit 62; a filter 766; and a write unit 64. The other components are the same as described with reference to FIG. 1, and description thereof will be omitted.

The stream analyzer 726 is different from the stream analyzer 26 illustrated in FIG. 1 in having the function of monitoring a CGMS shown in FIG. 5. The stream analyzer 726 performs stream analysis on an input stream in the DVD-VR standard format, outputs stream analysis information SI as the stream analyzer 26, analyzes a CGMS and outputs the obtained CGMS analysis information CI to the filter 766.

If the CGMS analysis information CI indicates allowance of copying, the filter 766 produces an output from the stream rewriting unit 62 without change. If the CGMS analysis information CI indicates prohibition of copying, the output from the stream rewriting unit is not output. When a stream indicating allowance of copying is input to the filter 766 after detection of a stream indicating prohibition of copying, the subsequent stream indicating allowance of copying is subjected to modification again for a SCR, a PTS and a DTS.

Figure 31:
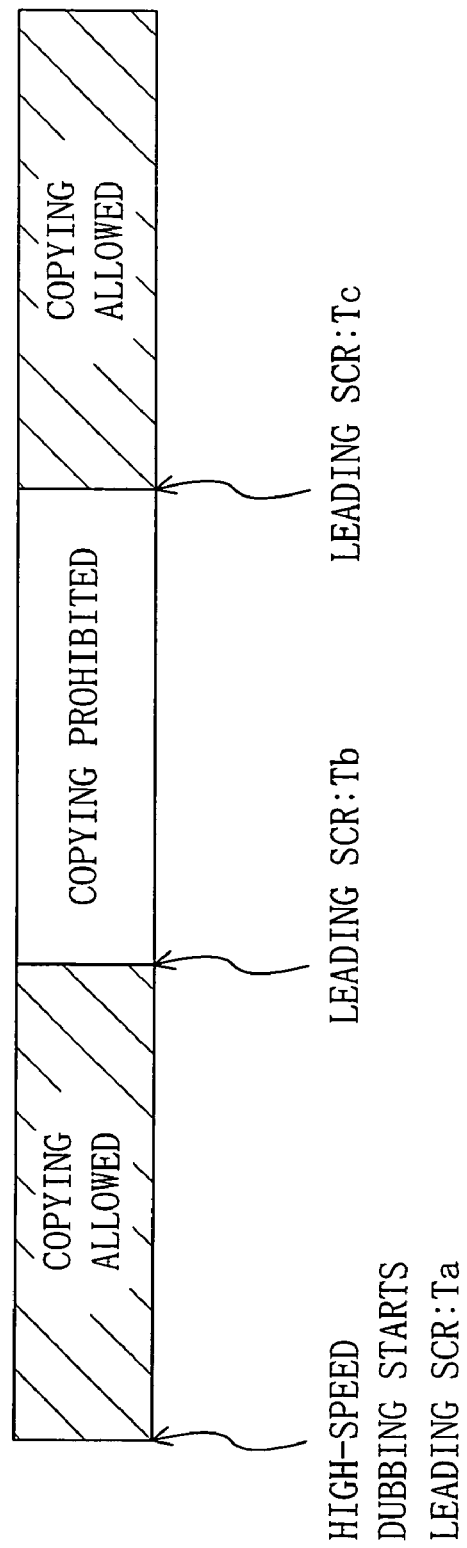
FIG. 31 is an explanatory diagram illustrating remodification of SCRs.

FIG. 31 is an explanatory diagram illustrating remodification of SCRs. FIG. 31 shows a stream on which high-speed dubbing is to be performed. Copying of the first portion of this stream is allowed, copying of the second portion thereof is prohibited, and copying of the third portion thereof is allowed. When high-speed dubbing starts, the leading SCR is Ta, each of the SCRs in the subsequent packs is calculated by:

$$(\text{output SCR}) = (\text{SCR of input packet}) - Ta$$

Then, when a subsequent stream which is not allowed to be copied is input, this stream is not output to outside. Thereafter, when a subsequent stream which is allowed to be copied is input, time information becomes discontinuous because no SCR associated with a stream which is not allowed to be copied is contained in a stream to be output to outside. When the time information becomes discontinuous, a stream fails to be played back in some cases.

To prevent this, when a stream which is not allowed to be copied is input, the filter 766 holds an SCR (Tb) in the leading pack and, when a stream which is allowed to be copied (and in which an SCR in its leading pack is Tc) is input again, the filter 766 modifies the SCR according to the equation:

$$(\text{output SCR}) = (\text{SCR in input packet}) - Ta - (Tc - Tb)$$

and outputs the resultant SCR. Then, no discontinuity of time information between streams of a content which is allowed to be copied occurs. The filter 766 also performs similar processing on PTSs and DTSs.

In this manner, in the high speed dubbing apparatus 700 illustrated in FIG. 30, even in a case where contents which are allowed to be copied and contents which are not allowed to be copied both exist, high-speed dubbing of a content which is allowed to be copied is enabled.

INDUSTRIAL APPLICABILITY

As described above, in a high speed dubbing apparatus according to the present invention, reading of a bit stream in the DVD-VR standard, conversion of the bit stream into a bit stream in the DVD-video standard to write the resultant bit stream are performed at high speed. Accordingly, the high speed dubbing apparatus is useful for, for example, DVD recorders for dubbing pictures recorded on a recording medium to another recording medium or other medium.

The invention claimed is:
1. A high speed dubbing apparatus, comprising:
a read section for reading a bit stream conforming to a DVD-VR standard from a first storage device, analyzing the readout bit stream and outputting obtained stream analysis information and the readout bit stream;
a first buffer for storing an output from the read section and outputting the stored bit stream, the first buffer having a capacity equal to or larger than the size of a VOBU (Video Object Unit) of the readout bit stream;
a navigation pack generator for replacing a real-time data information pack in the bit stream output from the first buffer with a navigation pack using the stream analysis information, and outputting a resultant bit stream;
a second buffer for storing an output from the navigation pack generator and outputting the stored bit stream, the second buffer having a capacity equal to or larger than the size of the VOBU of the readout bit stream; and
a write section for converting the bit stream output from the second buffer into a bit stream conforming to a DVD-video standard using the stream analysis information, and writing the converted bit stream in a second storage device,
wherein a first sum is less than both a second sum and a third sum, the first sum is a sum of:
  a time required for the first buffer to output the bit stream stored in the first buffer,
  a time required for the navigation pack generator to replace the real-time data information pack with the navigation pack, and
  a time required for the second buffer to store the resultant bit stream,
the second sum is a sum of:
  a time required for the read section to read the bit stream from the first storage device,
  a time required for the read section to analyze the readout bit stream, and
  a time required for the first buffer to store the readout bit stream, and
the third sum is a sum of:
  a time required for the second buffer to output the bit stream stored in the second buffer,
  a time required for the write section to convert the bit stream output from the second buffer, and
  a time required for the write section to write the converted bit stream in the second storage device, and
wherein the read section, the navigation pack generator, and the write section operate in parallel.

2. The high speed dubbing apparatus of claim 1, wherein the second buffer has a capacity equal to or less than the capacity of a cache memory included in the second storage device.

3. The high speed dubbing apparatus of claim 1, further comprising a buffer checking unit for measuring, by performing reading from the first storage device, the capacity of a cache memory included in the first storage device and outputting a measurement result,
wherein the capacity of the first buffer is changed according to the measurement result.

4. The high speed dubbing apparatus of claim 1, further comprising a buffer checking unit for measuring, by performing writing in the second storage device, the capacity of a cache memory included in the second storage device and outputting a measurement result,
wherein the capacity of the second buffer is changed according to the measurement result.

5. The high speed dubbing apparatus of claim 1, further comprising a buffer checking unit for measuring the capacity of a cache memory included in the first storage device by performing reading from the first storage device, for measuring the capacity of a cache memory included in the second storage device by performing writing in the second storage device, and for outputting a smaller one of obtained measurement results,
wherein the capacities of the first and second buffers are changed to a capacity indicated by the measurement result.

6. The high speed dubbing apparatus of claim 1, wherein the read section reads bit streams in parallel from a plurality of said first storage devices in each of which portions of data in the DVD-VR standard format each corresponding to a given number of bits are stored, and the read section outputs the readout bit streams as one bit stream.

7. The high speed dubbing apparatus of claim 6, wherein the given number is 16.

8. The high speed dubbing apparatus of claim 6, wherein the given number is 8.

9. The high speed dubbing apparatus of claim 1, comprising a plurality of said first buffers,
wherein the read section reads a bit stream from a plurality of said first storage devices in each of which a portion of data in the DVD-VR standard format corresponding to data of a given size is stored and provides an output to a buffer associated with one of the first storage devices from which the readout bit stream has been output, and after reading from one of the first storage devices has started, reading from another one of the first storage devices starts.

10. The high speed dubbing apparatus of claim 9, wherein the given size is an integral multiple of the size of the VOBU of the readout bit stream.

11. The high speed dubbing apparatus of claim 1, further comprising a write unit for writing, in the first storage device, a bit stream obtained by conversion in the write section and conforming to the DVD-video standard,
wherein the read section reads the bit stream conforming to the DVD-video standard and written in the first storage device in the case of performing, after termination of dubbing of a content, dubbing of the content again, and
the write section writes the bit stream conforming to the DVD-video standard and read out by the read section in the second storage device.

12. The high speed dubbing apparatus of claim 11, wherein in the case of dubbing of a portion of the bit stream conforming to the DVD-video standard and read out by the read section, the navigation pack generator modifies a portion of information included in a navigation pack of the bit stream.

13. The high speed dubbing apparatus of claim 11, wherein in the case of dubbing of a portion of the bit stream conforming to the DVD-video standard and read out by the read section, the write section removes a PES_extension_field in the bit stream or modifies time information.

14. The high speed dubbing apparatus of claim 1, further comprising a filter for controlling an output of the bit stream obtained by conversion in the write section and conforming to the DVD-video standard to the second storage device,
wherein the read section monitors copyright information on the bit stream read out from the first storage device and conforming to the DVD-VR standard and outputs a monitoring result, and
the filter does not output the bit stream conforming to the DVD-video standard to the second storage device when the monitoring result of the copyright information output from the read section indicates prohibition of copying.

15. The high speed dubbing apparatus of claim 14, wherein the read section monitors CGMS (Copy Generation Management System) information as the copyright information.

16. The high speed dubbing apparatus of claim 14, wherein when copyright information on a first portion of the bit stream conforming to the DVD-VR standard indicates prohibition of copying and copyright information on a second portion following the first portion indicates allowance of copying, the read section holds time information on the first portion and uses, as time information on the second portion, a result obtained by subtracting the time information on the first portion from time information on the second portion.

17. A high speed dubbing apparatus comprising:
  a read section for reading a bit stream conforming to a DVD-VR standard and a navigation pack added to the bit stream from a first storage device, removing one of a real time data information pack and the navigation pack in the bit stream, and producing an output;
  a buffer for storing the output from the read section and outputting a bit stream, the buffer having a capacity equal to or larger than the size of a VOBU (Video Object Unit) of the readout bit stream; and a write section for converting the bit stream output from the buffer into a bit stream conforming to a DVD-video standard, and writing the resultant bit stream in a second storage device, and a buffer checking unit for measuring the capacity of a cache memory included in the first storage device by performing reading from the first storage device, for measuring the capacity of a cache memory included in the second storage device by performing writing in the second storage device, and for outputting a smaller one of obtained measurement results, wherein the capacity of the buffer is changed to a capacity indicated by the measurement result, and the read section and the write section operate in parallel.

* * * * *